(12) United States Patent
Shintou et al.

(10) Patent No.: US 9,146,486 B2
(45) Date of Patent: Sep. 29, 2015

(54) TONER

(71) Applicant: CANON KABUSHIKI KAISHA, Tokyo (JP)

(72) Inventors: Taichi Shintou, Saitama-shi (JP); Akiko Kitao, Kawasaki-shi (JP); Yuko Katsumoto, Yokohama-shi (JP); Takeshi Miyazaki, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/183,432

(22) Filed: Feb. 18, 2014

(65) Prior Publication Data

US 2014/0170552 A1    Jun. 19, 2014

Related U.S. Application Data

(63) Continuation of application No. PCT/JP2013/005050, filed on Aug. 27, 2013.

(30) Foreign Application Priority Data

Aug. 29, 2012 (JP) .................. 2012-188150

(51) Int. Cl.
*G03G 9/08* (2006.01)
*G03G 9/09* (2006.01)
*C09B 57/00* (2006.01)

(52) U.S. Cl.
CPC .............. *G03G 9/0906* (2013.01); *C09B 57/00* (2013.01); *G03G 9/0804* (2013.01); *G03G 9/0806* (2013.01); *G03G 9/0808* (2013.01); *G03G 9/0924* (2013.01)

(58) Field of Classification Search
CPC .. G03G 9/0914; G03G 9/0906; G03G 9/0924
USPC .................................................. 430/108.21
See application file for complete search history.

(56) References Cited

U.S. PATENT DOCUMENTS

| | | | |
|---|---|---|---|
| 5,580,980 | A | 12/1996 | Etzbach et al. |
| 5,785,719 | A | 7/1998 | Etzbach et al. |
| 6,528,223 | B1 | 3/2003 | Wilson et al. |
| 8,247,145 | B2 | 8/2012 | Kusaka et al. |
| 2014/0162183 | A1 | 6/2014 | Katsumoto et al. |

FOREIGN PATENT DOCUMENTS

| | | |
|---|---|---|
| DE | 4217973 A | 12/1993 |
| EP | 1312986 A1 * | 5/2003 |
| JP | 5-34980 A | 2/1993 |
| JP | 7-502545 A | 3/1995 |
| JP | 10-508047 A | 8/1998 |
| JP | 2003-195570 A | 7/2003 |
| JP | 2009-80478 A | 4/2009 |
| WO | 92/19684 A1 | 11/1992 |

OTHER PUBLICATIONS

Diamond, Arthur S & David Weiss (eds.) Handbook of Imaging Materials, 2nd ed.. New York: Marcel-Dekker, Inc. (Nov. 2001) pp. 178-182.*
English language machine translation of DE 4217973 (Dec. 1993).*
International Preliminary Report on Patentability, International Application No. PCT/JP2013/005050, Mailing Date Mar. 12, 2015.

* cited by examiner

*Primary Examiner* — Christopher Rodee
(74) *Attorney, Agent, or Firm* — Fitzpatrick, Cella, Harper and Scinto

(57) ABSTRACT

The toner includes toner base particles, each of which contains a binder resin, a wax and a coloring agent, and a coloring matter compound represented by the general formula (1) is contained as the coloring agent.

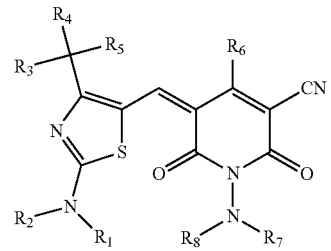

General formula (1)

wherein $R_1$, $R_2$, $R_6$ represent an alkyl group, $R_3$ to $R_5$ represent an alkyl group, or satisfy either of the following conditions i) and ii):

i) $R_3$, $R_4$ are bonded to each other, so as to form a cyclic organic functional group, and $R_5$ represents an alkyl group;

ii) $R_3$ to $R_5$ are bonded to one another, so as to form a cyclic organic functional group $R_7$, $R_8$ represent an alkyl group or an acyl group, or $R_7$, $R_8$ are bonded to each other, so as to form a cyclic organic functional group.

6 Claims, 1 Drawing Sheet

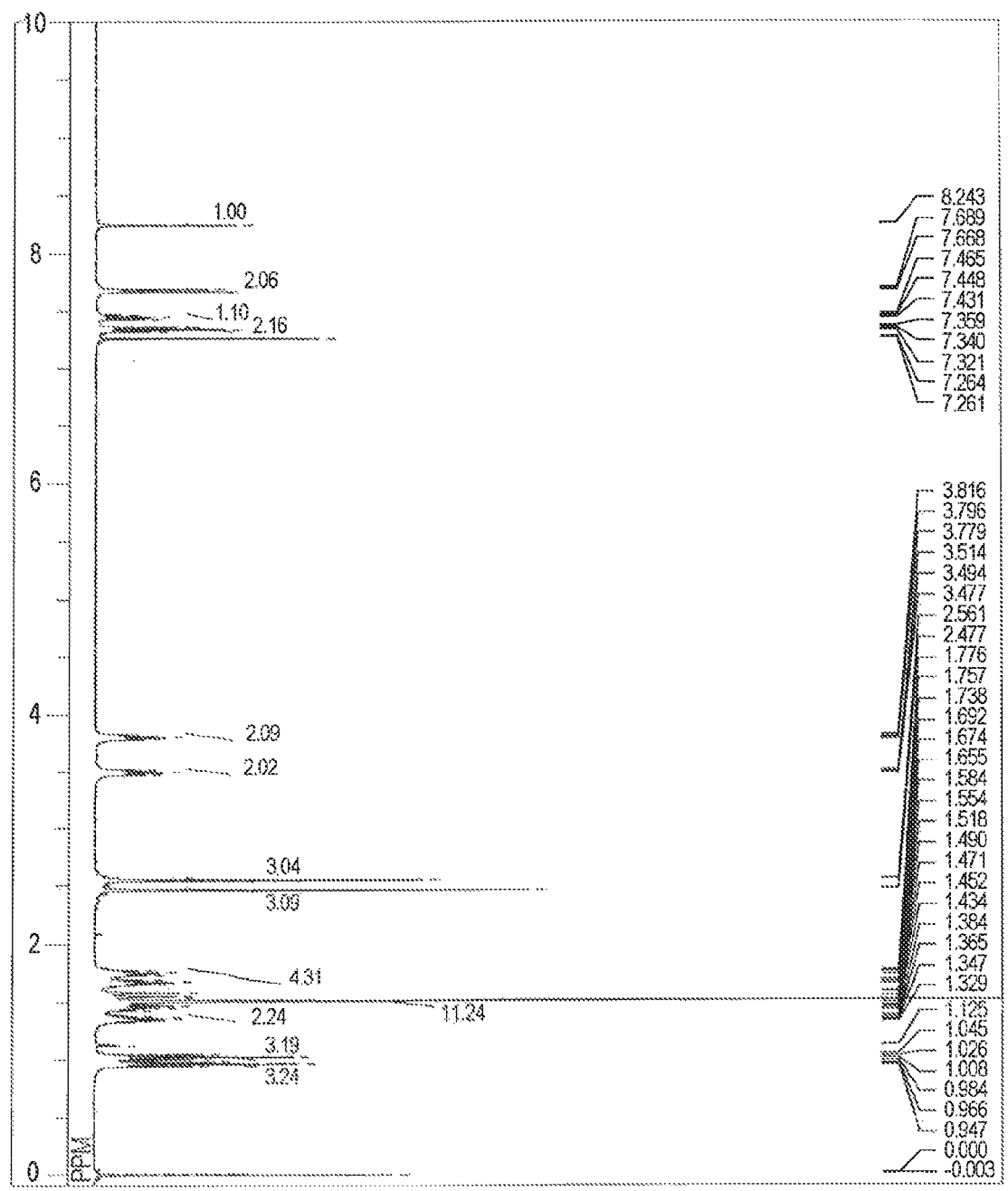

TONER

CROSS-REFERENCE TO RELATED APPLICATIONS

This application is a continuation of International Application No. PCT/JP2013/005050, filed Aug. 27, 2013, which claims the benefit of Japanese Patent Application No. 2012-188150, filed Aug. 29, 2012.

BACKGROUND OF THE INVENTION

1. Field of the Invention

The present invention relates to a toner used in a recording method such as an electrophotographic method, an electrostatic recording method, a magnetic recording method, or a toner jet method.

2. Related Background Art

Recently, color images have been widely employed in digital full color copying machines and printers, and there are increasing demands for image quality improvement. A color image original is subjected to color separation with color filters of respective colors of blue, green and red, and then, a latent image corresponding to the original image is developed with developers of respective colors of yellow, magenta, cyan and black. Therefore, coloring power of a coloring agent of each color contained in the developer largely affects the image quality. If a pigment is used as a coloring agent, it is necessary to sufficiently refine the pigment to be homogeneously dispersed in a corresponding one of various media.

As coloring agents for a magenta toner used as a color toner, a quinacridone pigment, a thioindigo pigment, a perylene pigment and a diketopyrrolopyrrole pigment, a xanthene dye, and a monoazo dye pigment are known, and use of a dye for improving coloring properties has been reported.

For example, a xanthene dye (see Japanese Patent Application Laid-Open No. 2009-80478 and Japanese Patent Application Laid-Open No. H05-34980) and a methine dye (see German Patent No. 4,217,973 and Japanese Patent Application Laid-Open No. 2003-195570) have been reported. A dye has, however, a problem of low light resistance in general, and even now, a coloring matter improved in light resistance is desired to be developed.

SUMMARY OF THE INVENTION

An object of the present invention is to solve the aforementioned problem. Specifically, the object is to provide a toner having good light resistance.

The aforementioned problem is solved by the following present invention.

Specifically, the present invention provides a toner including toner base particles, each of which contains a binder resin, a wax and a coloring agent, in which a coloring matter compound represented by the general formula (1) is contained as the coloring agent.

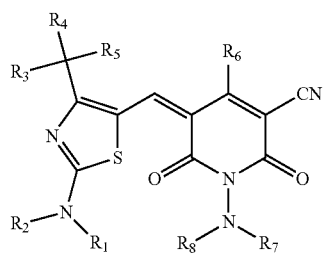

General formula (1)

wherein $R_1$, $R_2$ and $R_6$ each independently represent an alkyl group, $R_3$ to $R_5$ each independently represent an alkyl group, or satisfy either of the following conditions i) and ii):

i) $R_3$ and $R_4$ are bonded to each other, so as to form a cyclic organic functional group containing $R_3$, $R_4$ and a carbon atom bonded simultaneously to $R_3$ and $R_4$, and $R_5$ represents an alkyl group; and ii) $R_3$ to $R_5$ are bonded to one another, so as to form a cyclic organic functional group containing $R_3$, $R_4$, $R_5$ and a carbon atom bonded simultaneously to $R_3$ to $R_5$; and $R_7$ and $R_8$ each independently represent an alkyl group or an acyl group, or $R_7$ and $R_8$ are bonded to each other, so as to form a cyclic organic functional group containing $R_7$, $R_8$ and a nitrogen atom bonded simultaneously to $R_7$ and $R_8$.

The present invention can provide a toner with excellent light resistance by using a binder resin, a wax and a coloring agent containing a coloring matter compound represented by the general formula (1).

BRIEF DESCRIPTION OF THE DRAWINGS

FIGURE is a diagram of a $^1$H-NMR spectrum of a compound (1), that is, one of coloring matter compounds represented by the general formula (1), obtained in $CDCl_3$ at room temperature at 400 MHz.

DESCRIPTION OF THE EMBODIMENTS

Now, the present invention will be described in more details with reference to embodiments for practicing the invention.

The present inventors have made earnest studies for solving the conventional problem, resulting in finding the following: When a coloring agent contains not a thiazole ring having an unsubstituted phenyl group at the 4-position described in conventional technique but a coloring matter compound represented by the following general formula (1), compatibility with a resin is improved, so that a toner excellent in light resistance can be provided, and thus, the present invention was accomplished. Furthermore, the present inventors have also found that a toner having a sharp particle size distribution and stable developability can be obtained by producing a toner by suspension polymerization method using the coloring matter compound represented by the general formula (1).

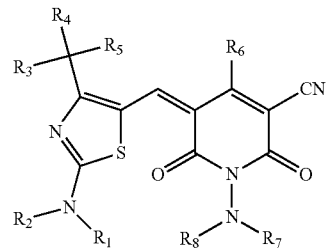

General formula (1)

wherein $R_1$, $R_2$ and $R_6$ each independently represent an alkyl group, $R_3$ to $R_5$ each independently represent an alkyl group, or satisfy either of the following conditions i) and ii):

i) $R_3$ and $R_4$ are bonded to each other, so as to form a cyclic organic functional group containing $R_3$, $R_4$ and a carbon atom bonded simultaneously to $R_3$ and $R_4$, and $R_5$ represents an alkyl group; and ii) $R_3$ to $R_5$ are bonded to one another, so as to form a cyclic organic functional group containing $R_3$, $R_4$, $R_5$ and a carbon atom bonded simultaneously to $R_3$ to $R_5$; and $R_7$ and $R_8$ each independently represent an alkyl group or an acyl group, or $R_7$ and $R_8$ are bonded to each other, so as to form a cyclic organic functional group containing $R_7$, $R_8$ and a nitrogen atom bonded simultaneously to $R_7$ and $R_8$.

First, the coloring matter compound represented by the general formula (1) will be described.

The alkyl group as $R_1$ and $R_2$ of the general formula (1) is not especially limited, but examples include primary, secondary or tertiary, saturated or unsaturated, straight-chain, branched or cyclic alkyl groups having 1 to 20 carbon atoms, such as a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methyl cyclohexyl group, a 2-ethylpropyl group, a 2-ethylhexyl group, and a cyclohexenylethyl group. In particular, a branched alkyl group such as a 2-ethylhexyl group can be suitably used because the compatibility with a resin is improved and excellent light resistance is attained in using such a group.

The alkyl group used as $R_3$ to $R_5$ of the general formula (1) is not especially limited, and examples include alkyl groups having 1 to 4 carbon atoms such as a methyl group, an ethyl group, an n-propyl group, an iso-propyl group and an n-butyl group. In particular, a methyl group can be suitably used because the compatibility with a resin is improved and excellent light resistance is attained in using this group.

The cyclic organic functional group formed in the general formula (1) by a bond of $R_3$ and $R_4$ and containing $R_3$, $R_4$ and a carbon atom simultaneously bonded to $R_3$ and $R_4$ is not especially limited, but examples include polycyclic and monocyclic saturated cyclic hydrocarbon rings such as a cyclohexyl group and a cycloheptyl group.

The cyclic organic functional group formed by a bond of $R_3$ to $R_5$ and containing $R_3$, $R_4$, $R_5$ and a carbon atom simultaneously bonded to $R_3$ to $R_5$ is not especially limited, but an example includes an adamantyl group.

The alkyl group as $R_6$ of the general formula (1) is not especially limited, but examples include alkyl groups such as a methyl group, an ethyl group, an n-propyl group, an iso-propyl group, an n-butyl group, an iso-butyl group, a 2-methylbutyl group, a 2,3,3-trimethylbutyl group and an octyl group. In particular, an alkyl group such as a methyl group, an n-butyl group, a 2-methylbutyl group, or 2,3,3-trimethylbutyl group can be suitably used because the compatibility with a resin is improved and excellent light resistance is attained in using such a group.

The alkyl group as $R_7$ and $R_8$ of the general formula (1) is not especially limited, but examples include primary, secondary or tertiary, saturated or unsaturated, straight-chain, branched or cyclic alkyl groups having 1 to 20 carbon atoms, such as a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methyl cyclohexyl group, 2-ethylpropyl, a 2-ethylhexyl group, and a cyclohexenylethyl group.

The acyl group as $R_7$ and $R_8$ of the general formula (1) is not especially limited, but examples include a formyl group, a substituted or unsubstituted alkyl carbonyl group having 2 to 30 carbon atoms, a substituted or unsubstituted aryl carbonyl group having 7 to 30 carbon atoms, and a hetero ring carbonyl group. Specific examples include an acetyl group, a propionyl group, a pivaloyl group, a benzoyl group, a naphthoyl group, a 2-pyridylcarbonyl group, and a 2-furylcarbonyl group.

The cyclic organic functional group formed in the general formula (1) by a bond of $R_7$ and $R_8$ and containing $R_7$, $R_8$ and a nitrogen atom simultaneously bonded to $R_7$ and $R_8$ is not especially limited, but examples include a piperidinyl group, a piperazinyl group and a morpholinyl group.

In particular, at least one of $R_7$ and $R_8$ can be an alkyl group because the compatibility with a resin is improved and excellent light resistance is attained in such a case. In this case, a methyl group can be more suitably used.

The coloring matter compound of the present invention represented by the general formula (1) can be synthesized by referring to a known method described in International Publication No. WO92/19684.

An embodiment of a preparation method for a coloring matter compound having a structure represented by the aforementioned general formula (1) will now be described, but the preparation method is not limited to the following.

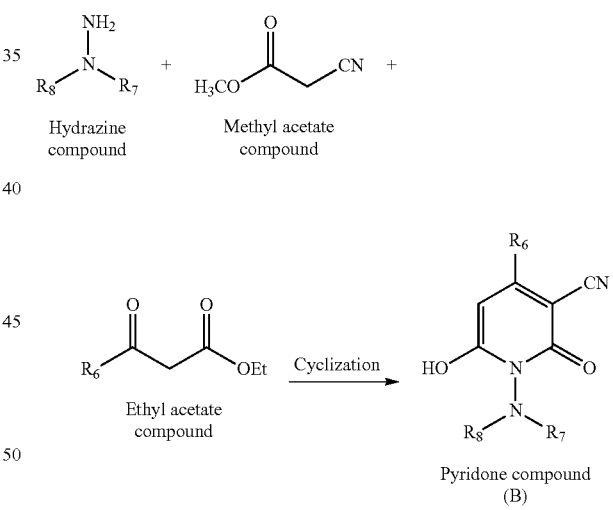

Pyridone compound
(B)

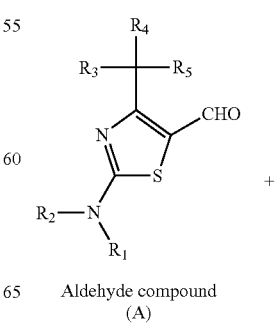

Aldehyde compound
(A)

-continued

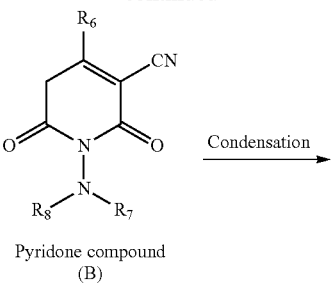

Pyridone compound
(B)

Condensation →

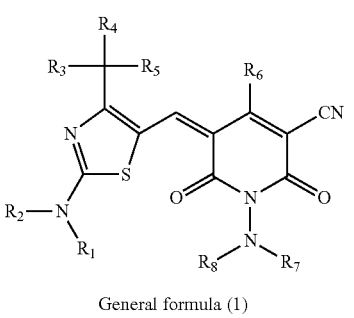

General formula (1)

Incidentally, $R_1$ to $R_8$ of the compounds and the coloring matter compound represented by the general formula (1) in the aforementioned reaction formulas are the same as those defined above. Besides, the compound of the general formula (1) has cis-trans isomers, which also fall under the scope of the present invention. Furthermore, although the pyridone compound (B) has different structures in the aforementioned two reaction formulas, these compounds are isomers in an equilibrium relationship, and are substantially the same compound.

The coloring matter compound of the present invention represented by the general formula (1) can be prepared by condensing the aldehyde compound (A) and the pyridone compound (B).

The aldehyde compound (A) used in the present invention can be synthesized by referring to the known method described in International Publication No. WO92/19684.

Suitable examples of the aldehyde compound (A) include, but are not limited to, the following aldehyde compounds (1) to (13):

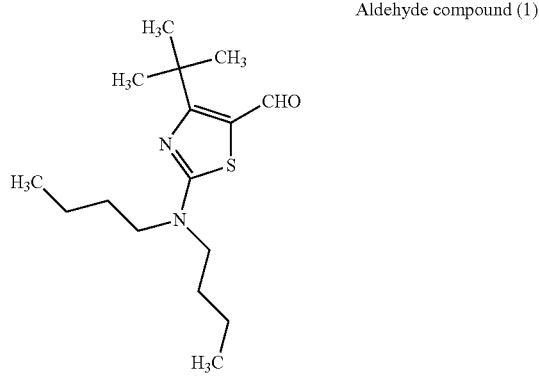

Aldehyde compound (1)

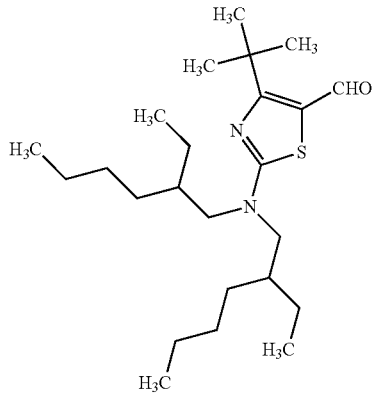

Aldehyde compound (2)

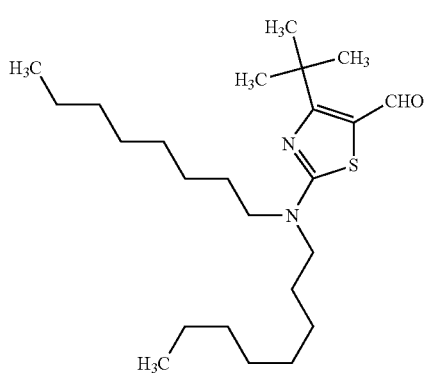

Aldehyde compound (3)

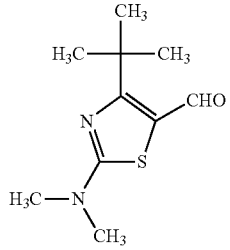

Aldehyde compound (4)

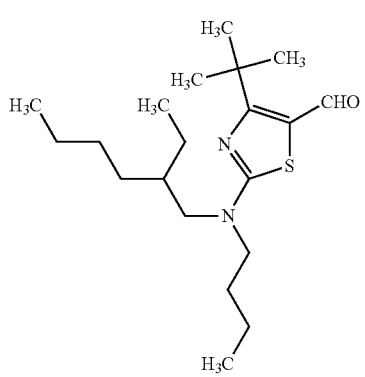

Aldehyde compound (5)

Aldehyde compound (6)
Aldehyde compound (7)
Aldehyde compound (8)
Aldehyde compound (9)
Aldehyde compound (10)
Aldehyde compound (11)
Aldehyde compound (12)
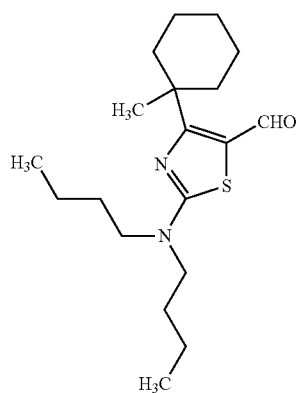
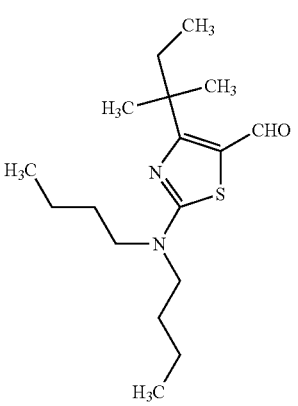

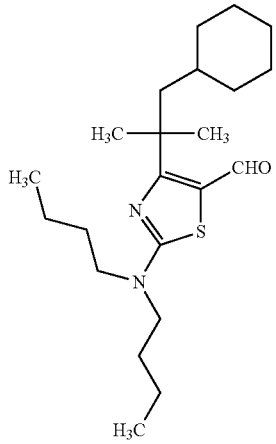

Aldehyde compound (13)

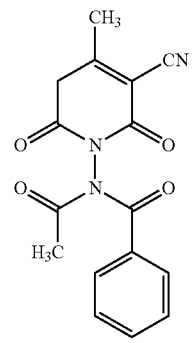

Pyridone compound (1)

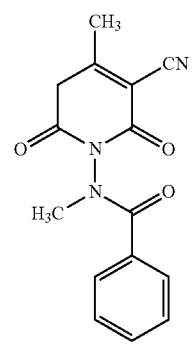

Pyridone compound (2)

First, cyclization performed for obtaining the pyridone compound (B) will be described.

The pyridone compound (B) can be synthesized by cyclization for coupling three components, that is, a hydrazine compound, a methyl acetate compound and an ethyl acetate compound.

This cyclization can be performed with no solvent used, but is preferably performed in the presence of a solvent. The solvent is not especially limited as long as the solvent is not involved in the reaction, and examples include water, methanol, ethanol, acetic acid and toluene. Alternatively, a mixture of two or more solvents can be used, and a mixing ratio of the mixture can be arbitrarily determined. The amount of the reaction solvent used is preferably 0.1 to 1000% by mass, and more preferably 1.0 to 150% by mass based on the amount of the methyl acetate compound.

Since the reaction can proceed rapidly using a base in this cyclization, a base can be suitably used. Examples of a usable base specifically include: organic bases such as pyridine, 2-methylpyridine, diethylamine, diisopropylamine, triethylamine, piperidine, phenylethylamine, isopropylethylamine, methylaniline, 1,4-diazabicyclo[2.2.2]octane, tetrabutyl ammonium hydroxide, 1,8-diazabicyclo[5.4.0]undecene, and potassium acetate; organic metals such as n-butyl lithium and tert-butyl magnesium chloride; inorganic bases such as sodium borohydride, metallic sodium, potassium hydride, and calcium oxide; and metal alkoxides such as potassium tert-butoxide, sodium tert-butoxide, and sodium ethoxide. Among these bases, triethylamine or piperidine is preferably used, and triethylamine is more preferably used. The amount of the base used is preferably 0.01 to 100% by mass, more preferably 0.1 to 20% by mass and further more preferably 0.5 to 5% by mass based on the amount of the methyl acetate compound. After completing the reaction, the resulting reaction product is purified by distillation, recrystallization or silica gel chromatography, and thus, a desired pyridone compound can be obtained.

Suitable examples of the pyridone compound (B) include, but are not limited to, the following pyridone compounds (1) to (15):

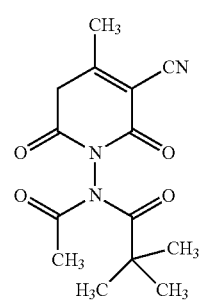

Pyridone compound (3)

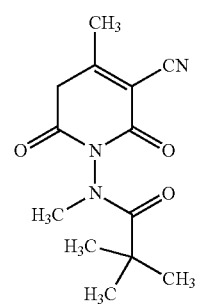

Pyridone compound (4)

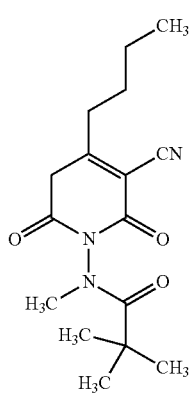
Pyridone compound (5)
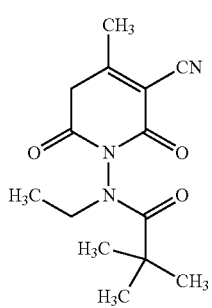
Pyridone compound (6)
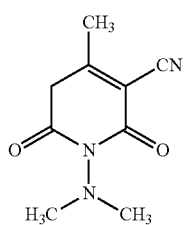
Pyridone compound (7)
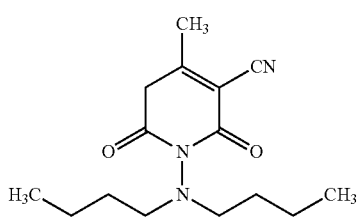
Pyridone compound (8)
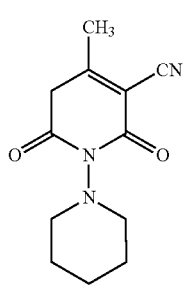
Pyridone compound (9)
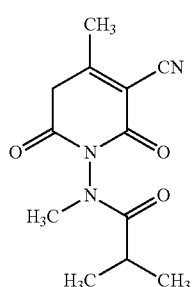
Pyridone compound (10)
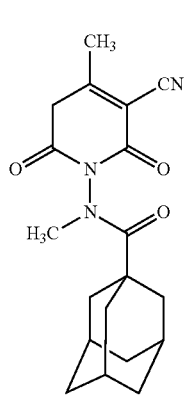
Pyridone compound (11)
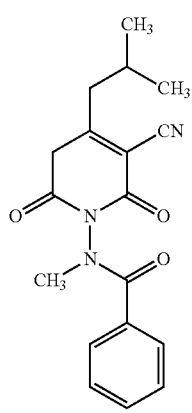
Pyridone compound (12)
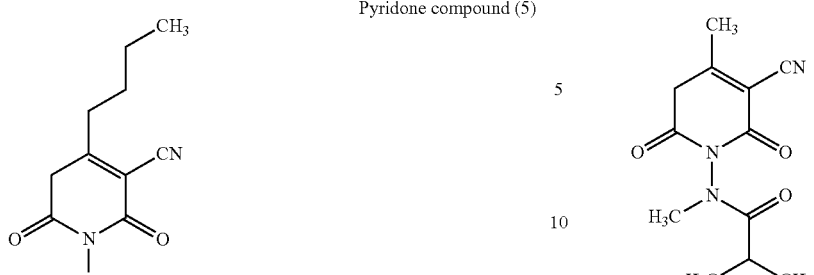
Pyridone compound (13)

Pyridone compound (14)

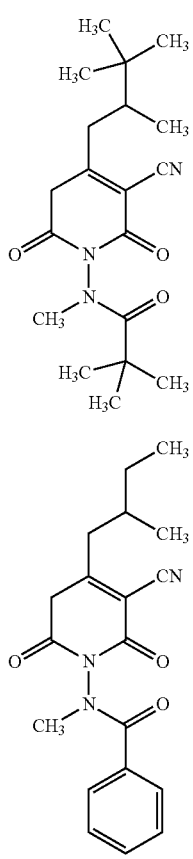

Pyridone compound (15)

Next, condensation performed for obtaining the coloring matter compound represented by the general formula (1) will be described.

The coloring matter compound represented by the general formula (1) can be synthesized by condensation for condensing the aldehyde compound (A) and the pyridone compound (B).

This condensation can be performed with no solvent used, but is preferably performed in the presence of a solvent. The solvent is not especially limited as long as the solvent is not involved in the reaction, and examples include chloroform, dichloromethane, N,N-dimethylformamide, toluene, xylene, tetrahydrofuran, dioxane, acetonitrile, ethyl acetate, methanol, ethanol, isopropanol, and tetrahydrofuran. Alternatively, a mixture of two or more solvents can be used, and a mixing ratio of the mixture can be arbitrarily determined. The amount of the reaction solvent used is preferably 0.1 to 1000% by mass, and more preferably 1.0 to 150% by mass based on the amount of the aldehyde compound.

The reaction temperature of the condensation is preferably −80° C. to 250° C., and more preferably −20° C. to 150° C. The reaction of this condensation is generally completed within 24 hours.

An acid or a base can be used in this condensation because the reaction can thus proceed rapidly.

Examples of a usable acid specifically include inorganic acids such as hydrochloric acid, sulfuric acid and phosphoric acid; organic acids such as p-toluenesulfonic acid, formic acid, acetic acid, propionic acid, and trifluoroacetic acid; and organic acid salts such as ammonium formate and ammonium acetate. Among these, p-toluenesulfonic acid, ammonium formate and ammonium acetate can be suitably used. The amount of the acid used is preferably 0.01 to 20% by mass and more preferably 0.1 to 5% by mass based on the amount of the aldehyde compound.

Examples of a usable base specifically include: organic bases such as pyridine, 2-methylpyridine, diethylamine, diisopropylamine, triethylamine, piperidine, phenylethylamine, isopropylethylamine, methylaniline, 1,4-diazabicyclo[2.2.2]octane, tetrabutyl ammonium hydroxide, 1,8-diazabicyclo[5.4.0]undecene, and potassium acetate; organic metals such as n-butyl lithium and tert-butyl magnesium chloride; inorganic bases such as sodium borohydride, metallic sodium, potassium hydride, and calcium oxide; and metal alkoxides such as potassium tert-butoxide, sodium tert-butoxide, and sodium ethoxide. Among these bases, triethylamine or piperidine is preferably used, and triethylamine is more preferably used. The amount of the base used is preferably 0.1 to 20% by mass and more preferably 0.2 to 5% by mass based on the amount of the aldehyde compound.

The coloring matter compound represented by the general formula (1) thus obtained is subjected to an aftertreatment performed in a general organic synthesis, and thereafter, is purified by separation, recrystallization, reprecipitation, and column chromatography, and thus, a coloring matter compound with high purity can be obtained.

One of or a combination of two or more of the coloring matter compounds represented by the general formula (1) of the present invention may be used in order to adjust the color tone and the like according to an application purpose. Furthermore, two or more of known pigments or dyes may be used in combination.

Preferable examples of the coloring matter compound of the present invention include, but are not limited to, the following compounds (1) to (25).

Compound (1)

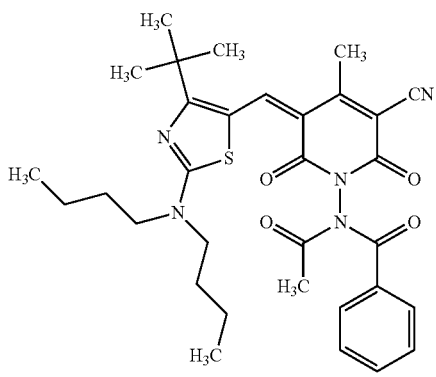

Compound (2)

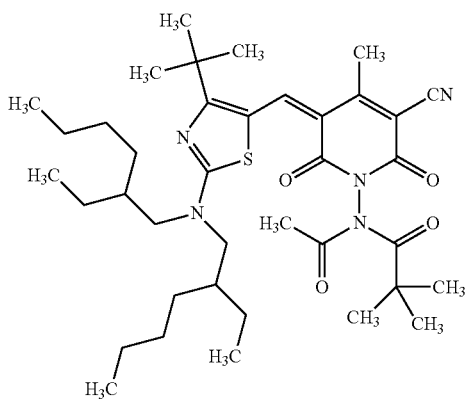

Compound (3)
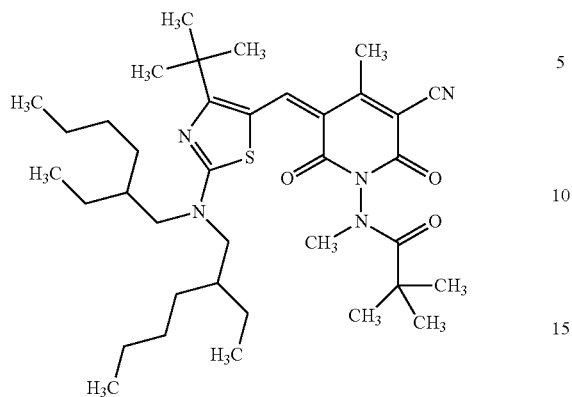
Compound (4)
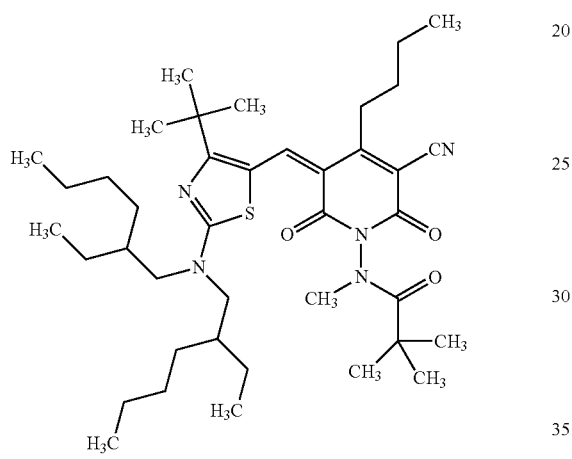
Compound (5)
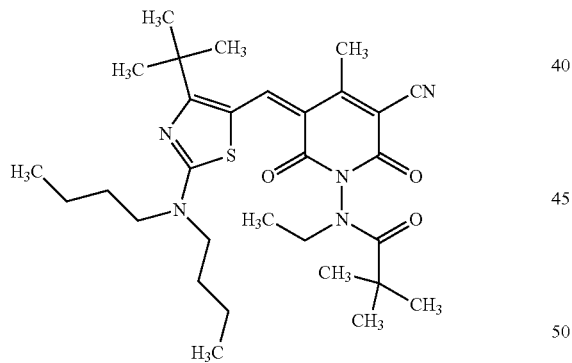
Compound (6)
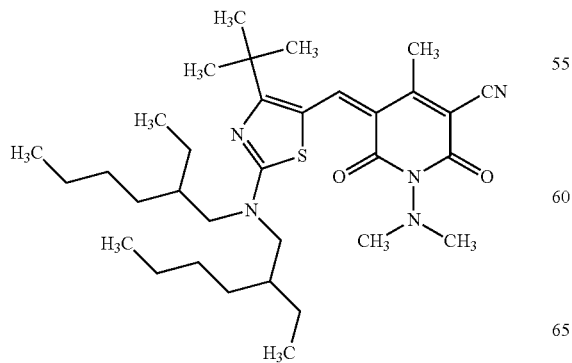
Compound (7)
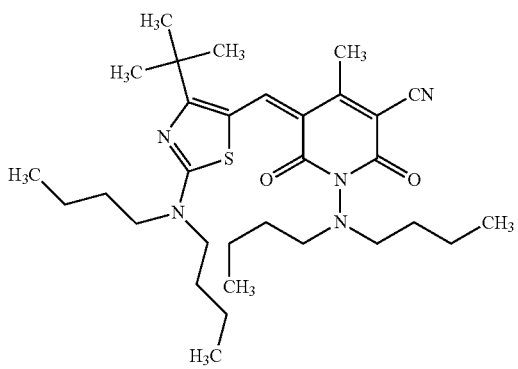
Compound (8)
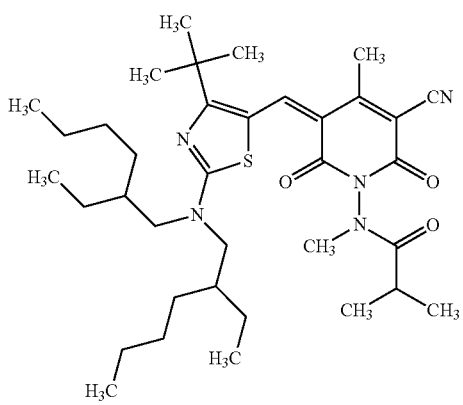
Compound (9)
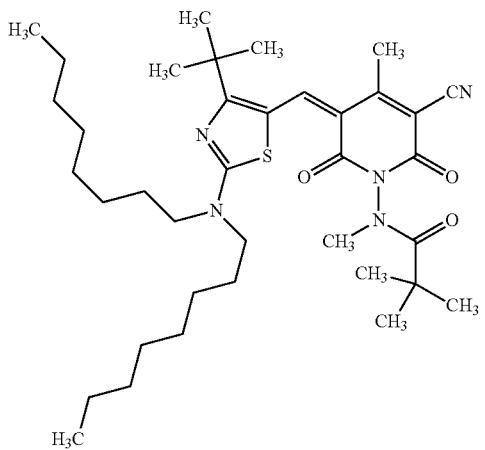
Compound (10)
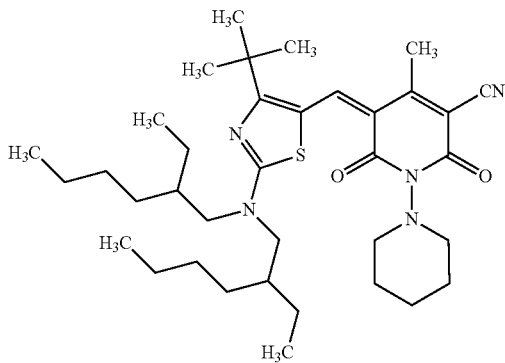

Compound (11)
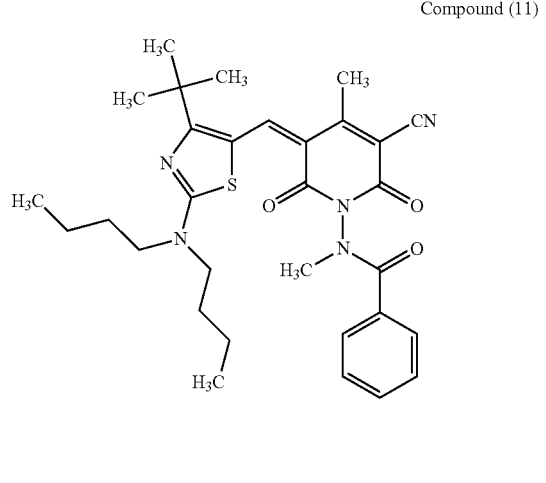
Compound (14)
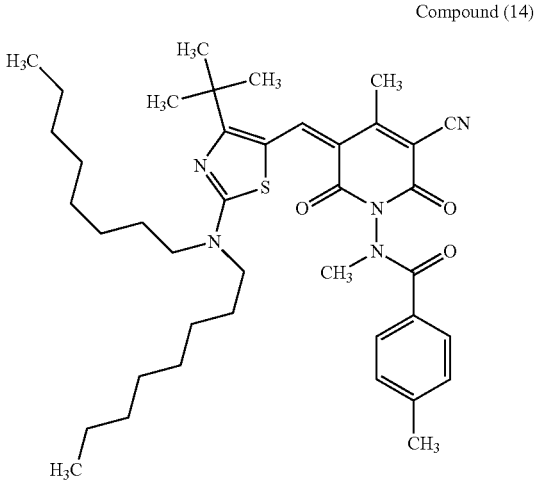
Compound (12)
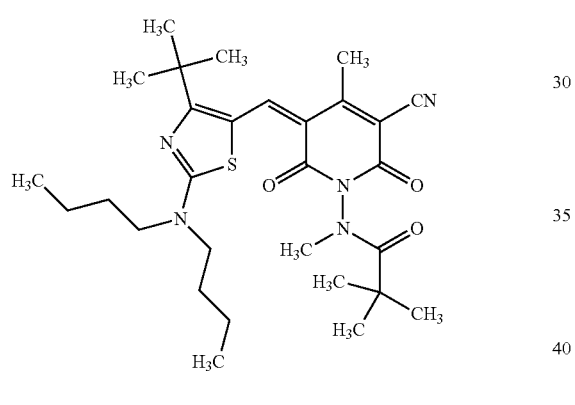
Compound (15)
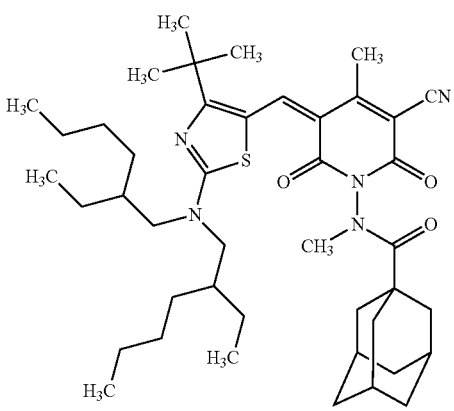
Compound (3)
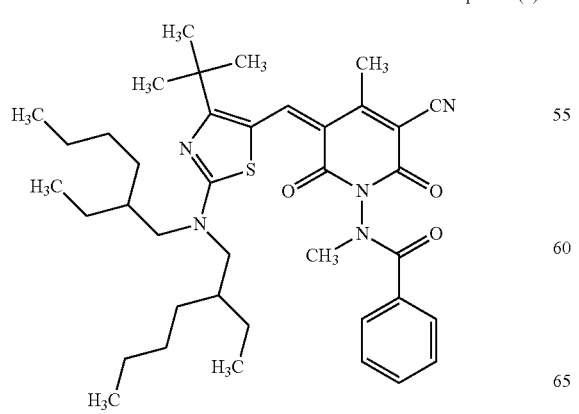
Compound (16)
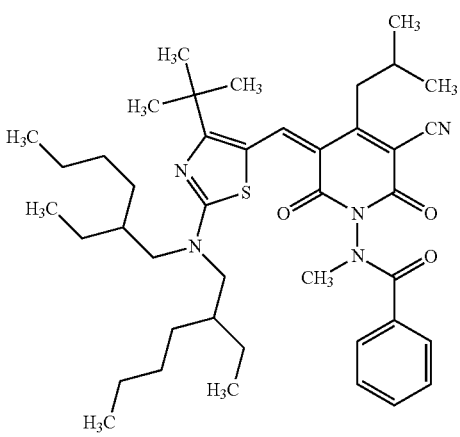

Compound (17)
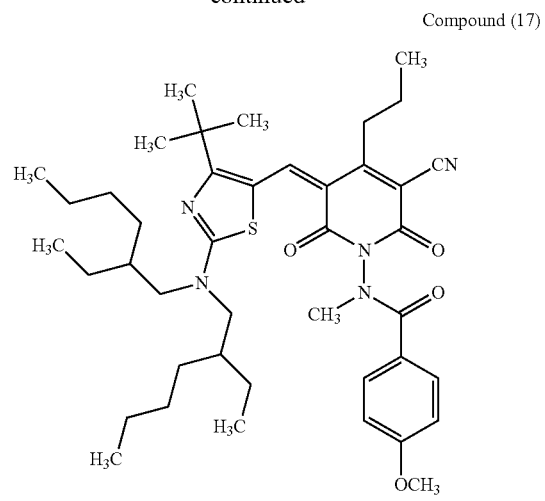
Compound (18)
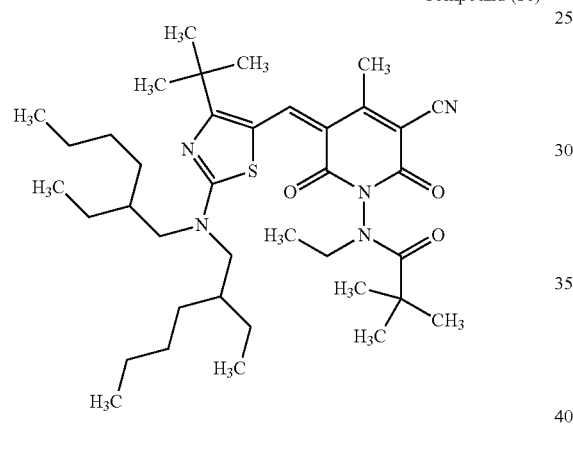
Compound (19)
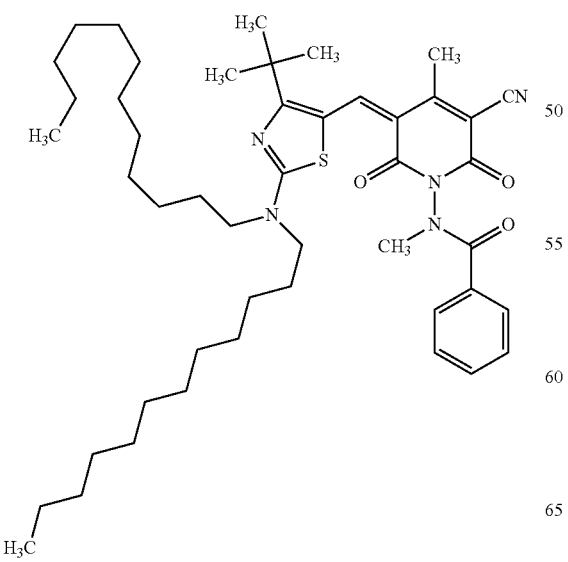
Compound (20)
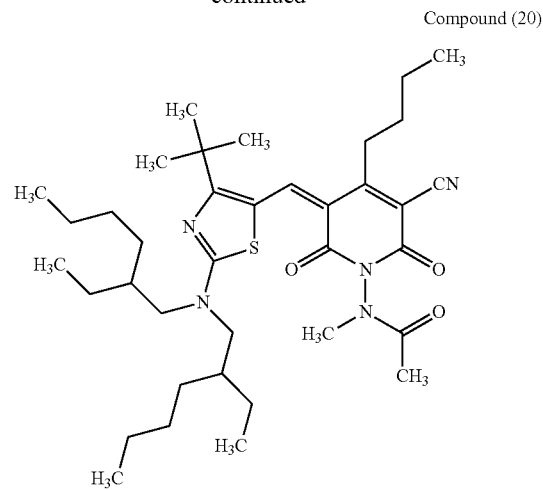
Compound (21)
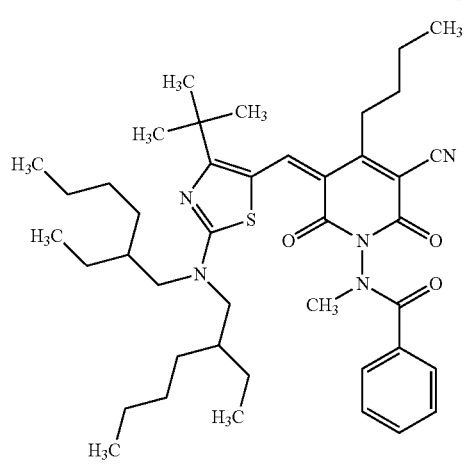
Compound (22)
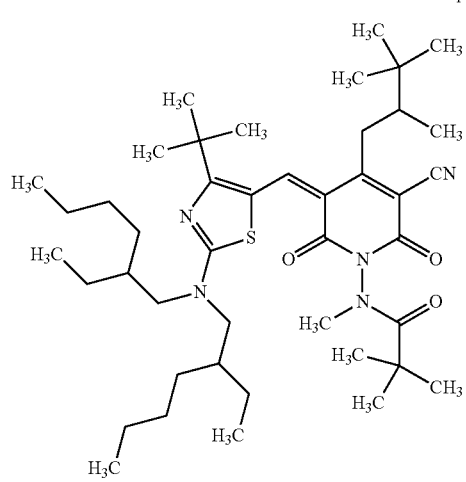

-continued

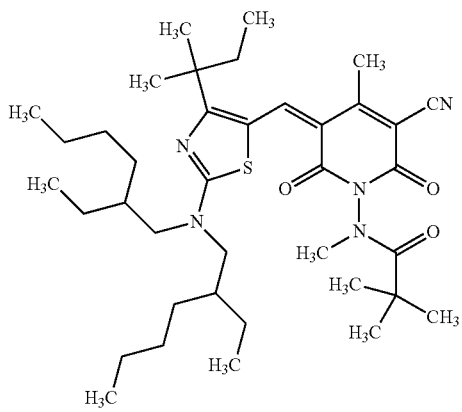

Compound (23)

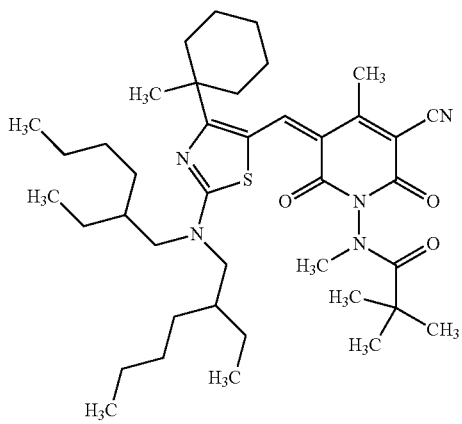

Compound (24)

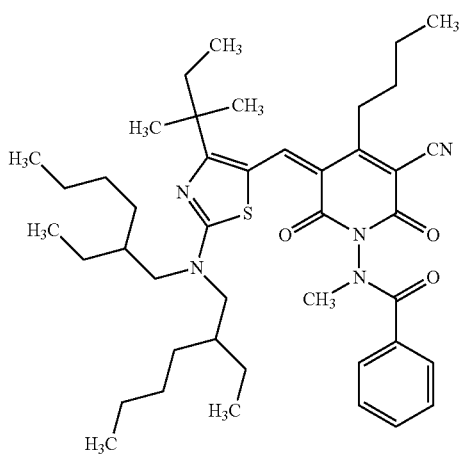

Compound (25)

As the coloring matter compound represented by the general formula (1) used in the present invention, these coloring matter compounds may be used singly or in combinations with two or more of known pigments or dyes in order to adjust the color tone and the like according to producing means used for a toner.

Next, the toner of the present invention will be described. First, components of the toner of the present invention will be described.

<Binder Resin>

The binder resin used in the present invention is not especially limited, and an example includes a thermoplastic resin. Specific examples of the binder resin include: homopolymers or copolymers of styrenes (styrene resins) such as styrene, p-chlorostyrene and α-methylstyrene; homopolymers or copolymers of esters having a vinyl group (vinyl resins) such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; homopolymers or copolymers of vinyl nitriles (vinyl resins) such as acrylonitrile and methacrylonitrile; homopolymers or copolymers of vinyl ethers (vinyl resins) such as vinyl ethyl ether, and vinyl isobutyl ether; homopolymers or copolymers of ketones (vinyl resins) such as vinyl methyl ketone, vinyl ethyl ketone and vinyl isopropenyl ketone; homopolymers or copolymers of olefins (olefin resins) such as ethylene, propylene, butadiene and isoprene; and non-vinyl condensation resins such as an epoxy resin, a polyester resin, a polyurethane resin, a polyamide resin, a cellulose resin and a polyether resin, and graft polymers of such a non-vinyl condensation resin and a vinyl monomer. One of these resins may be singly used, or two or more of these may be used together.

Furthermore, the polyester resin usable as the binder resin is synthesized from an acid and an alcohol.

The acid component is not especially limited, and specific examples include the following compounds: oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, 1,18-octadecanedicarboxylic acid, and lower alkyl esters and anhydrides of these acids. In particular, aliphatic dicarboxylic acids are preferably used, and an aliphatic dicarboxylic acid having saturated alkyl in an aliphatic site is more preferably used.

The alcohol component is not especially limited, but aliphatic diol can be used. Examples include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-dodecanediol, 1,12-undecanediol, 1,13-tridecanediol, 1,14-tetradecanediol, 1,18-octadecanediol and 1,20-eicosanediol.

In the present invention, in order to increase the mechanical strength of the toner particles and control the molecular weight of the binder resin, a crosslinking agent can be used in synthesizing the binder resin.

The crosslinking agent used for the toner of the present invention is not especially limited, and examples of a usable bifunctional crosslinking agent include divinyl benzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester type diacrylate, and compounds obtained by replacing diacrylates of these compounds with dimethacrylates.

A usable polyfunctional crosslinking agent is not especially limited, and examples include pentaerythritol triacrylate, trimethylolethane triacrylate, trimethylolpropane triacrylate, tetramethylolmethane tetraacrylate, oligo-ester acrylate and methacrylate thereof, 2,2-bis(4-methacryloxyphenyl)propane, diallyl phthalate, triallyl cyanurate, triallyl isocyanurate, and triallyl trimellitate.

Such a crosslinking agent is used in a content of preferably 0.05 to 10 parts by mass, and more preferably 0.1 to 5 parts by mass based on 100 parts by mass of a polymerizable monomer used in synthesizing the binder resin.

<Wax Component>

A wax component means a material used for preventing offset occurring in fixing the toner.

The wax component usable in the present invention is not especially limited, and examples include: petroleum waxes, such as a paraffin wax, a microcrystalline wax and petrolatum, and derivatives thereof; montan waxes and derivatives thereof; hydrocarbon waxes obtained by the Fischer-Tropsch method and derivatives thereof; polyolefin waxes such as polyethylene, and derivatives thereof; and natural waxes such as carnauba wax and candellila wax, and derivatives thereof. Here, derivatives include an oxide, a block copolymer with a vinyl monomer, and a graft-modified product. Other examples include: alcohols such as higher aliphatic alcohols; aliphatics such as stearic acid and palmitic acid, and compounds, acid amides, esters, and ketones thereof; hardened castor oil and a derivative thereof; and vegetable waxes and animal waxes. One of these waxes can be singly used, or a plurality of these may be used together.

The content of the wax component is preferably 2.5 to 15 parts by mass and more preferably 3.0 to 10 parts by mass in total based on 100 parts by mass of the binder resin.

The wax component has a melting point of preferably 50° C. or more and 200° C. or less and more preferably 55° C. or more and 150° C. or less.

Incidentally, a melting point herein refers to the maximum endothermic peak temperature on a differential scanning calorimetry (DSC) curve measured according to ASTM D3418-82. Specifically, the melting point of a wax is measured by using a differential scanning calorimeter (DSC822 manufactured by Mettler-Toledo International Inc.) in a measurement temperature range of 30 to 200° C. at a rate of temperature rise of 5° C./min, and corresponds to the maximum endothermic peak temperature in a temperature range from 30 to 200° C. on a DSC curve obtained during second temperature rise under environment of ordinary temperature and humidity.

<Coloring Agent>

As the coloring agent contained in toner base particles of the present invention, a coloring matter compound represented by the general formula (1) is used, and another coloring agent may be used together if necessary.

Examples of another coloring agent usable together include a condensed azo compound, an azo metal complex, a diketopyrrolopyrrole compound, an anthraquinone compound, a quinacridone compound, a basic dye lake compound, a naphthol compound, a benzimidazolone compound, a thioindigo compound, a perylene compound, a methine compound, and an allylamide compound. Specific examples include, but are not limited to, C.I. Pigment Orange 1, 5, 13, 15, 16, 34, 36, 38, 62, 64, 67, 72 and 74; C.I. Pigment Red 2, 3, 4, 5, 6, 7, 12, 16, 17, 23, 31, 32, 41, 48, 48:1, 48:2, 48:3, 48:4, 53:1, 57:1, 81:1, 112, 122, 123, 130, 144, 146, 149, 150, 166, 168, 169, 170, 176, 177, 178, 179, 181, 184, 185, 187, 190, 194, 202, 206, 208, 209, 210, 220, 221, 224, 238, 242, 245, 253, 254, 255, 258, 266, 269 and 282; C.I. Pigment Violet 13, 19, 25, 32 and 50; and various coloring agents classified as derivatives of these.

The content of the coloring agents can be 1 to 20 parts by mass in total based on 100 parts by mass of the binder resin in the toner.

<Charge Control Agent>

In the toner of the present invention, a charge control agent can be used by mixing with toner base particles as occasion demands. Thus, the frictional charge amount can be optimally controlled according to a development system.

As the charge control agent, any of known agents may be used, and in particular, a charge control agent that shows high charging speed and can stably retain a constant charge amount can be suitably used. Furthermore, if the toner is produced by suspension polymerization method, a charge control agent that has a low polymerization inhibiting property and contains substantially no component soluble in a water-based dispersion medium can be suitably used.

Examples of a charge control agent for controlling negative charging of the toner include polymers or copolymers having a sulfonic acid group, a sulfonic acid base or a sulfonic acid ester group, salicylic acid derivatives and metal complexes thereof, monoazo metal compounds, acetyl acetone metal compounds, aromatic oxycarboxylic acids, aromatic mono- and polycarboxylic acids, and metal salts, anhydrides and esters thereof, phenol derivatives such as bisphenol, urea derivatives, metal-containing naphthoic acid compounds, boron compounds, quaternary ammonium salts, calixarene, and resin-based charge control agents.

Furthermore, examples of a charge control agent for controlling positive charging of the toner include nigrosine-modified products with nigrosine and aliphatic acid metal salt and the like, guanidine compounds, imidazole compounds, quaternary ammonium salts such as tributylbenzylammonium 1-hydroxy-4-naphthosulfonate and tetrabutylammonium teterafluoroborate, and onium salts such as phosphonium salts, that is, analogues of these salts, and lake pigments thereof, triphenylmethane dyes and lake pigments thereof (using a laking agent of phosphotungstic acid, phosphomolybdic acid, phosphotungstomolybdic acid, tannic acid, lauric acid, gallic acid, ferricyanide, ferrocyanide or the like), metal salts of higher aliphatic acids, diorganotin oxides such as dibutyltin oxide, dioctyltin oxide, and dicyclohexyltin oxide, diorganotin borates such as dibutyltin borate, dioctyltin borate and dicyclohexyltin borate, and resin-based charge control agents. One of these charge control agents may be singly used, or two or more of these may be used in combination if necessary.

<Fluidizing Agent>

In the toner of the present invention, an inorganic fine powder may be externally added, as a fluidizing agent, to the toner base particles. In other words, the inorganic fine powder used as the fluidizing agent functions as an external additive. As the inorganic fine powder, a fine powder of silica, titanium oxide or alumina, a multiple oxide thereof, or a surface-treated product thereof can be used.

Next, a production method for the toner of the present invention will be described. Examples of the production method for the toner base particles contained in the toner of the present invention include a pulverization method, suspension polymerization method, suspension granulation method, emulsion polymerization method and emulsion aggregation method.

If the coloring matter compound represented by the general formula (1) of the present invention is used as the coloring agent, the toner can be produced by a production method in which granulation is performed in a water-based medium, such as the suspension polymerization method or the suspension granulation method. Furthermore, the toner of the present invention can be used in a developer to be employed in liquid development (hereinafter referred to as the liquid developer).

<Coloring Matter Dispersion>
Next, a coloring matter dispersion used in the toner of the present invention will be described. A dispersion medium herein refers to water, an organic solvent or a mixture thereof.

The coloring matter dispersion is obtained by dispersing, in a dispersion medium, a coloring agent such as a coloring matter compound represented by the general formula (1). Specifically, the coloring matter dispersion is obtained, for example, as follows: A coloring agent such as a coloring matter compound represented by the general formula (1), and a resin if necessary, are dissolved in a dispersion medium, so as to be sufficiently blended thoroughly with the dispersion medium with stirring. The coloring agent can be finely dispersed stably in the form of uniform fine particles by applying mechanical shearing force with a disperser such as a ball mill, a paint shaker, a dissolver, an attritor, a sand mill or a high speed mill.

In the present invention, the content of the coloring agent such as the coloring matter compound in the coloring matter dispersion is preferably 1.0 to 30 parts by mass based on 100 parts by mass of the dispersion medium. The content is more preferably 2.0 to 20 parts by mass, and particularly preferably 3.0 to 15 parts by mass. When the content of the coloring agent falls in the aforementioned range, viscosity increase and lowering of dispersibility of the coloring agent can be prevented, and good coloring power can be exhibited.

In the present invention, the coloring agent can be dispersed in water by using an emulsifier. Examples of the emulsifier include a cationic surfactant, an anionic surfactant and a nonionic surfactant. Examples of the cationic surfactant include dodecyl ammonium chloride, dodecyl ammonium bromide, dodecyl trimethyl ammonium bromide, dodecyl pyridinium chloride, dodecyl pyridinium bromide, and hexadecyl trimethyl ammonium bromide. Examples of the anionic surfactant include fatty acid soap, such as sodium stearate and sodium dodecanoate, sodium dodecyl sulfate, sodium dodecylbenzene sulfonate, and sodium lauryl sulfate. Examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, and mono-decanoyl sucrose.

Examples of the organic solvent used as the dispersion medium include the following: alcohols such as methyl alcohol, ethyl alcohol, denatured ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, and cyclohexanol; glycols such as methyl cellosolve, ethyl cellosolve, diethylene glycol, and diethylene glycol monobutyl ether; ketones such as acetone, methyl ethyl ketone, and methyl isobutyl ketone; esters such as ethyl acetate, butyl acetate, ethyl propionate, and cellosolve acetate; hydrocarbon solvents such as hexane, octane, petroleum ether, cyclohexane, benzene, toluene and xylene; halogenated hydrocarbon solvents such as carbon tetrachloride, trichloroethylene and tetrabromoethane; ethers such as diethyl ether, dimethyl glycol, trioxane and tetrahydrofuran; acetals such as methylal and diethyl acetal; organic acids such as formic acid, acetic acid and propionic acid; and sulfur- or nitrogen-containing organic compounds such as nitrobenzene, dimethyl amine, monoethanol amine, pyridine, dimethyl sulfoxide and dimethylformamide.

Alternatively, a polymerizable monomer can be used as the organic solvent. The polymerizable monomer is an addition polymerizable or condensation polymerizable monomer, and an addition polymerizable monomer can be suitably used. Specific examples include the following: styrene monomers such as styrene, o-methylstyrene, m-methylstyrene, p-methylstyrene, o-ethylstyrene, m-ethylstyrene and p-ethylstyrene; acrylate monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile and acrylic acid amide; methacrylate monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethyl amino ethyl methacrylate, diethyl amino ethyl methacrylate, methacrylonitrile and methacrylic acid amide; olefin monomers such as ethylene, propylene, butylene, butadiene, isoprene, isobutylene and cyclohexene; halogenated vinyls such as vinyl chloride, vinylidene chloride, vinyl bromide and vinyl iodide; vinyl esters such as vinyl acetate, vinyl propionate and vinyl benzoate; vinyl ethers such as vinyl methyl ether, vinyl ethyl ether and vinyl isobutyl ether; vinyl ketone compounds such as vinyl methyl ketone, vinyl hexyl ketone and methyl isopropenyl ketone. One of these may be singly used or two or more of these may be used in combination according to the application. If a polymer toner is produced by using the coloring matter dispersion, among the aforementioned polymerizable monomers, styrene or one of styrene monomers can be singly used or used in the form of a mixture with another polymerizable monomer. In particular, styrene can be suitably used because styrene is easy to handle.

The coloring matter dispersion may further contain a resin. Specific examples include the following: a polystyrene resin, a styrene copolymer, a polyacrylic acid resin, a polymethacrylic acid resin, a polyacrylic acid ester resin, a polymethacrylic acid ester resin, an acrylic acid copolymer, a methacrylic acid copolymer, a polyester resin, a polyvinyl ether resin, a polyvinyl methyl ether resin, a polyvinyl alcohol resin, a polyvinyl butyral resin, a polyurethane resin and a polypeptide resin. One of these resins may be singly used, or a mixture of two or more of these may be used.

Now, the production method for the toner of the present invention will be further described.

<Preparation of Toner Base Particles by Suspension Polymerization Method>

Preparation of the toner base particles by the suspension polymerization method will be described.

First, a polymerizable monomer composition is prepared by mixing a coloring agent containing a coloring matter compound represented by the general formula (1), a polymerizable monomer used as a material of a binder resin, a wax component, a polymerization initiator and the like. Next, the polymerizable monomer composition is dispersed in a water-based medium, so as to granulate particles of the polymerizable monomer composition. Then, the polymerizable monomer contained in the particles of the polymerizable monomer composition is polymerized in the water-based medium, so as to obtain toner base particles.

If the toner is produced by the suspension polymerization method using the coloring matter compound, a phenomenon that the viscosity of a polymer composition is increased with time can be suppressed, and hence, a toner having a sharp particle size distribution can be obtained. Furthermore, the material can be thus easily handled in producing the toner.

The polymerizable monomer composition used in the above step can be prepared by mixing a dispersion, which contains the coloring agent dispersed in a first polymerizable monomer, with a second polymerizable monomer. Specifically, the coloring agent containing the coloring matter compound represented by the general formula (1) is sufficiently dispersed in a first polymerizable monomer, and thereafter, the resulting dispersion is mixed together with another toner material with a second polymerizable monomer, and thus, the coloring matter compound can be present in a better dispersion state in the toner base particles.

Examples of the polymerization initiator used in the suspension polymerization method include known polymerization initiators such as an azo compound, an organic peroxide, an inorganic peroxide, an organic metal compound and a photopolymerization initiator. More specific examples include: azo polymerization initiators such as 2,2'-azobis (isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis (isobutyrate); organic peroxide polymerization initiators such as benzoyl peroxide, di-tert-butyl peroxide, tert-butyl peroxy isopropyl monocarbonate, tert-hexyl peroxy benzoate, and tert-butyl peroxy benzoate; inorganic peroxide polymerization initiators such as potassium persulfate and ammonium persulfate; redox initiators such as hydrogen peroxide-ferrous type, BPO-dimethylaniline type, or cerium (IV) salt-alcohol type. Examples of the photopolymerization initiator include acetophenone, benzoin ether, and ketal initiators. One of these methods may be singly used, or two or more of these methods may be used in combination.

The concentration of the polymerization initiator is preferably 0.1 to 20 parts by mass based on 100 parts by mass of the polymerizable monomer, and more preferably 0.1 to 10 parts by mass. The type of the polymerization initiator depends upon the polymerization method, and one of or a mixture of the aforementioned initiators can be selectively used by referring to a 10-hour half-life period temperature.

Incidentally, the water-based medium means a medium containing water as a principal component. Specific examples of the water-based medium include water itself, water containing a pH adjuster, and water containing an organic solvent.

The water-based medium used in the suspension polymerization method can contain a dispersion stabilizer. As the dispersion stabilizer, a known inorganic or organic dispersion stabilizer can be used. Examples of the inorganic dispersion stabilizer include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica and alumina. Examples of the organic dispersion stabilizer include polyvinyl alcohol, gelatin, methyl cellulose, methyl hydroxypropyl cellulose, ethyl cellulose, sodium salt of carboxymethyl cellulose, and starch. Alternatively, a nonionic, anionic or cationic surfactant may be used. Examples of such a surfactant include sodium dodecyl sulfate, sodium tetradecyl sulfate, sodium pentadecyl sulfate, sodium octyl sulfate, sodium oleate, sodium laurate, potassium stearate, and calcium oleate.

Among these dispersion stabilizers, a poorly water-soluble inorganic dispersion stabilizer soluble in an acid can be used in the present invention. Such a dispersion stabilizer can be used in a content of 0.2 to 2.0 parts by mass based on 100 parts by mass of the polymerizable monomer from the viewpoint of droplet stability in the water-based medium of the polymerizable monomer composition. Furthermore, in the present invention, the water-based medium can be prepared by using 300 to 3000 parts by mass of water based on 100 parts by mass of the polymerizable monomer composition.

A commercially available dispersion stabilizer can be directly dispersed, but in order to obtain dispersion stabilizer particles with a fine and uniform particle size, the aforementioned poorly water-soluble inorganic dispersion stabilizer can be prepared in water with high speed stirring. If, for example, calcium phosphate is used as the dispersion stabilizer, fine particles of calcium phosphate can be formed by mixing a sodium phosphate aqueous solution and a calcium chloride aqueous solution with high speed stirring, and thus, a suitable dispersion stabilizer can be obtained.

<Preparation of Toner Base Particles by Suspension Granulation Method>

The preparation of the toner base particles by the suspension granulation method will now be described. Since the preparation by the suspension granulation method does not include a heating step, compatibilization of a resin and a wax component occurring in using a low melting point wax can be suppressed, so as to prevent lowering of the glass transition temperature of the toner derived from the compatibilization. Furthermore, the toner material used as the binder resin can be selected from a large number of alternatives in employing the suspension granulation method, and a polyester resin, which is generally regarded as advantageous to fixability, can be easily employed as a principal component. Therefore, the suspension granulation method is an advantageous production method for producing a toner having a resin composition for which the suspension polymerization method cannot be employed.

Toner base particles prepared by the suspension granulation method are produced, for example, as follows:

First, a solvent composition is prepared by mixing, in a solvent, a coloring agent containing a coloring matter compound represented by the general formula (1), a binder resin, a wax component and the like. Next, the solvent composition is dispersed in a medium for granulating particles of the solvent composition, so as to obtain a toner particle suspension. The solvent is removed from the thus obtained suspension by heating or reducing pressure, and thus, toner base particles can be obtained.

The solvent composition used in the aforementioned step can be prepared by mixing a dispersion, which contains the coloring agent dispersed in a first solvent, with a second solvent. Specifically, the coloring agent containing the coloring matter compound represented by the general formula (1) is sufficiently dispersed in a first solvent, and the resultant is mixed together with another toner material with a second solvent, and thus, the coloring agent can be present in a better dispersion state in the toner base particles.

Examples of the solvent usable in the suspension granulation method include: hydrocarbons such as toluene, xylene and hexane; halogenated hydrocarbons such as methylene chloride, chloroform, dichloroethane, trichloroethane and carbon tetrachloride; alcohols such as methanol, ethanol, butanol and isopropyl alcohol; polyalcohols such as ethylene glycol, propylene glycol, diethylene glycol and triethylene glycol; cellosolves such as methyl cellosolve and ethyl cellosolve; ketones such as acetone, methyl ethyl ketone and methyl isobutyl ketone; ethers such as benzyl alcohol ethyl ether, benzyl alcohol isopropyl ether and tetrahydrofuran; and esters such as methyl acetate, ethyl acetate and butyl acetate. One of these may be singly used, or a mixture of two or more of these may be used. Among these, a solvent that has a low boiling point and can sufficiently dissolve the binder resin can be suitably used in order that the solvent can be easily removed from the toner particle suspension.

The amount of the solvent used is preferably 50 to 5000 parts by mass and more preferably 120 to 1000 parts by mass based on 100 parts by mass of the binder resin.

The medium used in the suspension granulation method can contain a dispersion stabilizer. As the dispersion stabilizer, a known inorganic or organic dispersion stabilizer can be used. Examples of the inorganic dispersion stabilizer include calcium phosphate, calcium carbonate, aluminum hydroxide, calcium sulfate and barium carbonate. Examples of the organic dispersion stabilizer include water-soluble polymers such as polyvinyl alcohol, methyl cellulose, hydroxyethyl cellulose, ethyl cellulose, sodium salt of carboxymethyl cellulose, sodium polyacrylate and sodium polymethacrylate; and surfactants such as: anionic surfactants such as sodium dodecylbenzene sulfonate, sodium octadecyl sulfate, sodium oleate, sodium laurate and potassium stearate; cationic surfactants such as lauryl amine acetate, stearyl amine acetate and lauryl trimethyl ammonium chloride; ampholytic surfactants such as lauryl dimethyl amine oxide; and nonionic surfactants such as polyoxyethylene alkyl ether, polyoxyethylene alkyl phenyl ether and polyoxyethylene alkyl amine.

The amount of the dispersion stabilizer used can be 0.01 to 20 parts by mass based on 100 parts by mass of the binder resin from the viewpoint of the droplet stability in the water-based medium of the solvent composition.

<Preparation of Toner Base Particles by Pulverization Method>

If toner base particles are produced by a pulverization method, a magnetic material, a wax, a charge control agent and another additive or the like are used if necessary.

Furthermore, production machines known to those skilled in the art, such as a mixer, a heating kneader and a classifier, can be used for the preparation.

First, these materials are sufficiently mixed with a mixer such as a Henschel mixer or a ball mill. Next, the resulting mixture is molten by using a heating kneader such as a roll, a kneader or an extruder. The resultant is further kneaded and mixed, so as to disperse the wax and the magnetic substance in the resins having been made compatible with each other. After solidifying the resultant by cooling, the thus obtained solid is ground and classified, so as to obtain toner base particles.

Examples of the binder resin used in preparing toner base particles by the pulverization method include the following: a vinyl resin, a polyester resin, an epoxy resin, a polyurethane resin, a polyvinyl butyral resin, a terpene resin, a phenol resin, an aliphatic or alicyclic hydrocarbon resin, an aromatic petroleum resin, rosin and modified rosin. In particular, a vinyl resin and a polyester resin are more preferably used from the viewpoint of chargeability and fixability. Particularly, a polyester resin is preferably used because effects in the chargeability and fixability can be increased by using this resin.

One of these resins may be singly used, or two or more of these may be used together. If a mixture of two or more of the resins is used, resins having different molecular weights are suitably mixed for controlling the viscoelasticity of the toner.

The binder resin used in preparing the toner base particles by the pulverization method has a glass transition temperature of preferably 45 to 80° C. and more preferably 55 to 70° C. The binder resin has a number average molecular weight (Mn) of preferably 1,500 to 50,000 (more preferably 2,500 to 50,000). Besides, the binder resin has a weight average molecular weight (Mw) of preferably 6,000 to 1,000,000.

The polyester resin used in the present invention is not especially limited, but the mole ratio of an alcohol component/an acid component thereof is preferably 45/55 to 55/45.

In the polyester resin used in the present invention, the environmental dependency of the charging characteristics of the toner is increased as the number of terminal groups of molecular chains is increased. Therefore, an acid value thereof is preferably 90 mgKOH/g or less and more preferably 50 mgKOH/g or less. Besides, a hydroxy value thereof is preferably 50 mgKOH/g or less and more preferably 30 mgKOH/g or less.

The polyester resin used in the present invention has a glass transition temperature of preferably 50 to 75° C. and more preferably 55 to 65° C.

Furthermore, the polyester resin has a number average molecular weight (Mn) of preferably 1,500 to 50,000 and more preferably 2,000 to 20,000.

Besides, the polyester resin has a weight average molecular weight (Mw) of preferably 6,000 to 100,000 and more preferably 10,000 to 90,000.

<Preparation of Toner Base Particles by Emulsion Aggregation Method>

Next, the preparation of the toner base particles by the emulsion aggregation method will be described.

First, various dispersions of the present invention (that is, dispersions of components of toner base particles such as a coloring agent, a resin and a wax) are prepared. At this point, a wax dispersion, a resin particle dispersion, a coloring agent particle dispersion and another toner component may be mixed as occasion demands.

A mixture of these dispersions are formed into toner base particles through a step of forming aggregate particles by aggregating the mixture (aggregation step), a step of fusing the aggregate particles by heating (fusion step), a washing step and a drying step.

Each of dispersions of the respective particles can be prepared by using a dispersant such as a surfactant. Specifically, the coloring agent particle dispersion is obtained by dispersing a coloring agent together with a surfactant in a water-based medium. The coloring agent particles are dispersed by a known method, and for example, a media type disperser such as a rotary shearing homogenizer, a ball mill, a sand mill or an attritor, or a high-pressure counter collision disperser can be suitably used.

Examples of the surfactant of the present invention include a water-soluble polymer, an inorganic compound and an ionic or nonionic surfactant. In particular, from the viewpoint of a problem of dispersibility, an ionic surfactant having high dispersibility is preferably used, and an anionic surfactant is particularly preferably used.

Furthermore, from the viewpoint of washability and surface active performance, the surfactant has a molecular weight of preferably 100 to 10,000 and more preferably 200 to 5,000.

Specific examples of the surfactant include water-soluble polymers such as polyvinyl alcohol, methyl cellulose, carboxymethyl cellulose and sodium polyacrylate; surfactants such as: anionic surfactants such as sodium dodecylbenzene sulfonate, sodium octadecyl sulfate, sodium oleate, sodium laurate and potassium stearate; cationic surfactants such as lauryl amine acetate and lauryl trimethyl ammonium chloride; ampholytic surfactants such as lauryl dimethyl amine oxide; and nonionic surfactants such as polyoxyethylene alkyl ether, polyoxyethylene alkyl phenyl ether and polyoxyethylene alkyl amine; and inorganic compounds such as tricalcium phosphate, aluminum hydroxide, calcium sulfate, calcium carbonate and barium carbonate.

One of these surfactants may be singly used, or two or more of these may be used in combination if necessary.

<Wax Dispersion>

The wax dispersion used in the present invention is obtained by dispersing a wax in a water-based medium. The wax dispersion is prepared by a known method.

<Resin Particle Dispersion>

The resin particle dispersion used in the present invention is obtained by dispersing resin particles in a water-based medium.

In the present invention, the water-based medium means a medium containing water as a principal component. Specific examples of the water-based medium include water itself, water containing a pH adjuster and water containing an organic solvent.

A resin contained as the resin particles in the resin particle dispersion is not especially limited as long as the resin is suitable to a toner having characteristics described below, and a thermoplastic binder resin having a glass transition temperature not higher than a fixing temperature employed in an electrophotographic apparatus can be suitably used.

Specific examples of the resin include: styrenes such as styrene, parachlorostyrene and α-methylstyrene; homopolymers like vinyl group monomers such as methyl acrylate, ethyl acrylate, n-propyl acrylate, lauryl acrylate, 2-ethylhexyl acrylate, methyl methacrylate, ethyl methacrylate, n-propyl methacrylate, lauryl methacrylate, 2-ethylhexyl methacrylate, acrylonitrile and methacrylonitrile, vinyl ether monomers such as vinyl methyl ether and vinyl isobutyl ether, vinyl ketone monomers such as vinyl methyl ketone, vinyl ethyl ketone and vinyl isopropenyl ketone and polyolefin monomers such as ethylene, propylene and butadiene; copolymers each obtained by a combination of two or more of these homopolymers, or mixtures of the homepolymer and the copolymer; and an epoxy resin, a polyester resin, a polyurethane resin, a polyamide resin, a cellulose resin and a polyether resin, and non-vinyl condensation resins, mixtures of any of these resins and any of the vinyl resins, and graft polymers obtained by polymerizing a vinyl monomer in the presence of these resins. From the viewpoint of the fixability and the chargeability performance attained as the toner, a polystyrene resin or a polyester resin can be particularly suitably used. One of these resins may be singly used, or two or more of these may be used together.

The resin particle dispersion used in the present invention is prepared by dispersing resin particles in a water-based medium. The resin particle dispersion is prepared by a known method. For example, if the resin particle dispersion contains resin particles of a vinyl monomer, in particular a styrene monomer, the resin particle dispersion can be prepared by subjecting the monomer to emulsion polymerization by using a surfactant or the like.

As another method for preparing a resin particle dispersion (for example, a polyester resin particle dispersion), it is possible to employ a method in which resin particles are dispersed in water together with an ionic surfactant and a polyelectrolyte by using a disperser such as a homogenizer. Thereafter, a solvent is transpired, so as to prepare a resin particle dispersion. Alternatively, a resin particle dispersion can be prepared by a method in which a mixture of a resin and a surfactant is emulsion dispersed in water by using a disperser such as a homogenizer, or by a phase-transfer emulsification method.

The median diameter on a volume basis of the resin particles contained in the resin particle dispersion is preferably 0.005 to 1.0 μm and more preferably 0.01 to 0.4 μm in consideration of the size of the toner base particles obtained after the aggregation.

The average particle size of the resin particles can be measured by, for example, a dynamic light scattering (DLS) method, a laser scattering method, a centrifugal settling method, a field-flow fractionation method, an electrical sensing zone method or the like. Incidentally, the average particle size herein means, unless otherwise mentioned, a 50% cumulative particle size (D50) on a volume basis measured by the dynamic light scattering (DLS)/laser Doppler method at 20° C. and a solid content of 0.01% by mass as described later.

<Coloring Agent Particle Dispersion>

The coloring agent particle dispersion is prepared by dispersing, in a water-based medium, a coloring agent such as a coloring matter compound represented by the general formula (1) together with a surfactant.

First, a coloring agent such as a coloring matter compound represented by the general formula (1) is prepared in the form of a dispersion. The coloring agent particles can be dispersed by a known method, and for example, a media type disperser such as a rotary shearing homogenizer, a ball mill, a sand mill or an attritor, or a high-pressure counter collision disperser can be suitably used.

The content of the coloring agent can be 1 to 20 parts by mass based on 100 parts by mass of the resin.

The amount of the surfactant used is 0.01 to 10.0 parts by mass and preferably 0.1 to 5.0 parts by mass based on 100 parts by mass of the coloring agent, and is particularly preferably 0.5 to 3.0 parts by mass because the surfactant can be thus easily removed from the toner particles. As a result, the amount of surfactant remaining in the obtained toner is so small that an image concentration of the toner is high and toner fogging is hard to occur.

[Aggregation Step]

A method for forming the aggregate particles is not especially limited, and a suitable example includes a method in which a pH adjuster, a flocculant, a stabilizer and the like are added to and mixed with the mixture, and a temperature, mechanical force (stirring) or the like is appropriately applied to the resulting mixture.

The pH adjuster of the present invention is not especially limited, and examples include alkalis such as ammonia and sodium hydroxide, and acids such as nitric acid and citric acid.

The flocculant is not especially limited, and examples include inorganic metal salts such as sodium chloride, magnesium carbonate, magnesium chloride, magnesium nitrate, magnesium sulfate, calcium chloride and aluminum sulfate, and di- or more valent metal complexes.

The stabilizer is principally a surfactant.

The surfactant is not especially limited, and examples include: water-soluble polymers such as polyvinyl alcohol, methyl cellulose, carboxymethyl cellulose and sodium polyacrylate; surfactants such as: anionic surfactants such as sodium dodecylbenzene sulfonate, sodium octadecyl sulfate, sodium oleate, sodium laurate and potassium stearate; cationic surfactants such as lauryl amine acetate and lauryl trimethyl ammonium chloride; ampholytic surfactants such as lauryl dimethyl amine oxide; and nonionic surfactants such as polyoxyethylene alkyl ether, polyoxyethylene alkyl phenyl ether and polyoxyethylene alkyl amine; and inorganic compounds such as tricalcium phosphate, aluminum hydroxide, calcium sulfate, calcium carbonate and barium carbonate. One of these surfactants may be singly used, or two or more of these may be used in combination if necessary.

The average particle size of the aggregate particles thus formed is not especially limited, and may be generally controlled to be equivalent to the average particle size of the toner particles to be obtained. The control can be easily performed by, for example, appropriately setting/changing the temperature at which the flocculant and the like are added/mixed and the conditions of stirring and mixing. Furthermore, in order to prevent the toner particles from welding to one another, the pH adjuster, the surfactant and the like can be appropriately introduced.

[Fusion Step]

In the fusion step, the aggregate particles are fused by heating, thereby forming the toner base particles.

The heating temperature may fall in a range from the glass transition temperature (Tg) of the resin contained in the aggregate particles to the decomposition temperature of the resin. For example, under stirring in the same manner as in the aggregation step, the progress of the aggregation is stopped by adding the surfactant or adjusting the pH, and the resulting aggregate particles are heated to a temperature not less than the glass transition temperature of the resin of the resin particles, so as to fuse and unite the aggregate particles.

The heating may be performed for a time duration for causing sufficient fusing, and specifically for approximately 10 minutes to 10 hours.

Furthermore, before or after the fusion step, a step of forming a core-shell structure by adding/mixing a fine particle dispersion, in which fine particles are dispersed, for allowing the fine particles to adhere to the aggregate particles (adhering step) can be further performed.

[Washing Step]

The particles resulting from the fusion step are washed, filtered and dried under appropriate conditions, thereby obtaining toner base particles. In this case, the toner base particles can be sufficiently washed in order to secure sufficient charging characteristics and reliability as the toner.

The washing method is not especially limited, and for example, a suspension containing the toner base particles is filtered, and the thus obtained filtrate is washed with distilled water with stirring, and the resulting filtrate is further filtered. From the viewpoint of the chargeability of the toner, the washing can be repeated until the filtrate attains electric conductivity of 150 µS/cm or less.

Furthermore, to the surfaces of the thus obtained toner base particles, inorganic grains such as silica, alumina, titania or calcium carbonate, or resin particles of a vinyl resin, a polyester resin or a silicone resin may be added under application of shearing force in a dry state. Such inorganic grains or resin particles function as an external additive such as a fluidity assistant or a cleaning assistant.

[Drying Step]

Drying can be performed by employing a known method such as a general vibrating fluidized drying method, a spray drying method, a freeze drying method or a flush jet method. The moisture content of the toner particles attained after the drying is preferably 1.5% by mass or less and more preferably 1.0% by mass or less.

The toner of the present invention preferably has a weight average particle size D4 of 4.0 to 9.0 µm and a ratio between the weight average particle size D4 and a number average particle size D1 (hereinafter referred to also as the weight average particle size D4/number average particle size D1 ratio or the D4/D1 ratio) of 1.35 or less. More preferably, the weight average particle size D4 is 4.9 to 7.5 µm, and the weight average particle size D4/number average particle size D1 ratio is 1.30 or less. If a ratio of particles having a weight average particle size D4 of less than 4.0 µm is increased, charge stability is difficult to attain when applied to an electrophotographic development system, and image degradation such as image fogging or development streaks can be easily caused in an operation for continuously making a large number of developments (an endurance operation). Particularly when a ratio of fine particles with the particle size of 2.5 µm or less is increased, this tendency becomes more conspicuous. Alternatively, if a ratio of particles having a weight average particle size D4 larger than 9.0 µm is increased, reproducibility of a halftone portion is largely degraded, and the resulting image becomes rough. Particularly when a ratio of coarse particles with the particle size of 10.0 µm or more is increased, this tendency becomes more conspicuous. If the weight average particle size D4/number average particle size D1 ratio exceeds 1.35, the fogging properties and the transferability are lowered, and line widths of narrow lines are largely varied (hereinafter designated as sharpness degradation).

The toner of the present invention has average roundness, measured by using a flow-type particle image analyzer, of preferably 0.930 to 0.995 and more preferably 0.960 to 0.990 because the transferability of the toner can be thus largely improved.

The toner of the present invention may be either of a magnetic toner or a non-magnetic toner. If the present toner is used as a magnetic toner, the toner base particles of the toner of the present invention may contain a magnetic material. Examples of such a magnetic material include iron oxides such as magnetite, maghemite and ferrite, an iron oxide containing another metal oxide, metals such as Fe, Co and Ni, and alloys and mixtures of these metals and other metals such as Al, Co, Cu, Pb, Mg, Ni, Sn, Zn, Sb, Be, Bi, Cd, Ca, Mn, Se, Ti, W and V.

<Method for Producing Liquid Developer>

Now, a method for producing a liquid developer will be described.

First, for producing the liquid developer, the toner of the present invention, and assistants such as a charge control agent and a wax if necessary, are dispersed or dissolved in an electrically insulating carrier liquid. Alternatively, a two-step process may be employed in which a developer is prepared by precedently preparing a concentrated toner and diluting the concentrated toner with an electrically insulating carrier liquid.

A disperser used in the present invention is not especially limited, and a media type disperser such as a rotary shearing homogenizer, a ball mill, a sand mill or an attritor, or a high-pressure counter collision disperser can be suitably used.

To the coloring matter compound represented by the general formula (1), one of or a combination of two or more of coloring agents such as known pigments and dyes can be added for use.

The resin, the wax and the coloring agent used in this invention are the same as those defined above.

The charge control agent used in the present invention is not especially limited as long as the agent is used in a liquid developer for electrostatic charge development, and examples include cobalt naphthenate, copper naphthenate, copper oleate, cobalt oleate, zirconium octylate, cobalt octylate, sodium dodecylbenzene sulfonate, calcium dodecylbenzene sulfonate, soybean lecithin and aluminum octoate.

The electrically insulating carrier liquid used in the present invention is not especially limited, and for example, an organic solvent having high electric resistance of $10^9$ Ω·cm or more and a low dielectric constant of 3 or less can be suitably used.

Specific examples include aliphatic hydrocarbon solvents such as hexane, pentane, octane, nonane, decane, undecane and dodecane; and solvents having a boiling point of 68 to 250° C. such as Isopar H, G, K, L and M (manufactured by Exxon Chemicals Ltd.) and Linealene Dimer A-20 and A-20H (manufactured by Idemitsu Kosan Co., Ltd.). One of these may be singly used or two or more of these may be used together as long as the viscosity of the system is not increased.

EXAMPLES

The present invention will now be described in more detail with reference to examples and comparative examples, and it is noted that the present invention is not limited to these examples. In the following description, the terms "part(s)" and "%" are used on a mass basis unless otherwise mentioned. Obtained compounds were identified by using a $^1$H nuclear magnetic resonance ($^1$H-NMR) spectrometer (ECA-400, manufactured by JEOL Ltd.) and an LC/TOF MS (LC/MSD TOF, manufactured by Agilent Technologies Inc.).

[Preparation of Coloring Matter Compound Represented by the General Formula (1)]

A coloring matter compound represented by the general formula (1) can be synthesized by known methods.

Coloring matter compounds represented by the general formula (1) were prepared as follows:

Preparation Example 1

Preparation of Compound (1)

To a 20 mL toluene suspension of 10 mmol of the pyridone compound (1), 100 mg of p-toluenesulfonic acid was added, the resulting solution was heated to 70° C., and a 20 mL toluene solution of 10 mmol of the aldehyde compound (1) was added dropwise thereto. The resultant was refluxed by heating at 160° C. for 6 hours while performing azeotropic dehydration. After completing the reaction, the resulting solution was cooled to room temperature, and diluted with isopropanol. After the diluted solution was concentrated under reduced pressure, the thus obtained residue was purified by column chromatography (eluent: ethyl acetate/heptane), so as to give 4.6 g (yield: 78%) of a compound (1). FIGURE illustrates a $^1$H-NMR spectrum of the compound (1) obtained in CDCl$_3$ at room temperature at 400 MHz.

[Analysis Result of Compound (1)]

[1] $^1$H-NMR (400 MHz, CDCl$_3$, room temperature): δ (ppm)=0.97 (3H, t, J=7.33 Hz), 1.03 (3H, t, J=7.33 Hz), 1.36 (2H, dd, J=7.33, 14.7 Hz), 1.43-1.58 (11H, m), 1.66-1.78 (4H, m), 2.48 (3H, s), 2.56 (3H, s), 3.50 (2H, t, J=7.56 Hz), 3.80 (2H, t, J=7.33 Hz), 7.34 (2H, t, J=7.56 Hz), 7.45 (1H, t, J=6.87 Hz), 7.68 (2H, d, J=8.24 Hz), 8.24 (1H, s)

[2] Mass Spectrometry (ESI-TOF): m/z=590.2989 (M+H)$^+$

Preparation Example 2

Preparation of Compound (3)

A 50 mL methanol solution of 10 mmol of the aldehyde compound (2) and 10 mmol of the pyridone compound (4) was stirred at room temperature for 3 days. After completing the reaction, the resulting solution was diluted with isopropanol and filtered, so as to give 5.4 g (yield: 82%) of a compound (3).

[Analysis Result of Compound (3)]

[1] $^1$H-NMR (400 MHz, CDCl$_3$, room temperature): δ (ppm)=0.93 (12H, q, J=6.87 Hz), 1.14 (6H, s), 1.30-1.39 (17H, m), 1.39-1.60 (11H, m), 1.84-1.92 (2H, m), 2.54 (3H, s), 3.16 (2H, s), 3.37-3.48 (3H, m), 3.58-3.92 (2H, dm), 8.31 (1H, s)

[2] Mass Spectrometry (ESI-TOF): m/z=654.4611 (M+H)$^+$

Preparation Example 3

Preparation of Compound (6)

A 50 mL ethanol solution of 10 mmol of the aldehyde compound (2) and 10 mmol of the pyridone compound (7) was stirred at room temperature for 3 days. After completing the reaction, the resulting solution was diluted with isopropanol and filtered, so as to give 5.1 g (yield: 87%) of a compound (6).

[Analysis Result of Compound (6)]

[1] $^1$H-NMR (400 MHz, CDCl$_3$, room temperature): δ (ppm)=0.92 (12H, q, J=7.02 Hz), 1.22-1.41 (16H, m), 1.54 (9H, s), 1.85-1.90 (2H, m), 2.50 (3H, s), 3.00 (6H, s), 3.37 (2H, d, J=5.50 Hz), 3.73 (2H, dq, J=4.27, 17.2 Hz), 8.28 (1H, s)

[2] Mass Spectrometry (ESI-TOF): M/z=584.4211 (M+H)$^+$

Preparation Example 4

Preparation of Compound (10)

A compound (10) was obtained in an amount of 4.8 g (yield: 77%) in the same manner as in Preparation Example 2 except that the pyridone compound (4) was changed to the pyridone compound (9).

[Analysis result of compound (10)]

[1] $^1$H-NMR (400 MHz, CDCl$_3$, room temperature): δ (ppm)=0.92 (12H, dt, J=7.90, 23.1 Hz), 1.20-1.34 (18H, m), 1.53 (3H, s), 1.73 (4H, q, J=5.65 Hz), 1.86-1.93 (2H, m), 2.49 (3H, s), 3.22 (2H, dd, J=4.58, 10.1 Hz), 3.37-3.41 (4H, m), 3.71-3.75 (2H, m), 8.24 (1H, s)

[2] Mass Spectrometry (ESI-TOF): M/z=624.4531 (M+H)$^+$

Preparation Examples 5 to 12

Preparation of Compounds (4), (12), (13), (15), (18), (20), (21) and (22)

In the same manner as in Preparation Example 2 except that the aldehyde compound (2) and the pyridone compound (4) were respectively changed to corresponding aldehyde compounds and pyridone compounds, corresponding compounds (4), (12), (13), (15), (18), (20), (21) and (22) were obtained.

[Analysis Result of Compound (4)]

[1] $^1$H-NMR (400 MHz, CDCl$_3$, room temperature): δ (ppm)=0.90-1.01 (15H, m), 1.14 (7H, s), 1.24-1.39 (16H, m), 1.52-1.66 (13H, m), 1.82-1.92 (2H, m), 2.84-2.89 (2H, m), 3.16 (2H, s), 3.37-3.42 (3H, m), 3.61-3.94 (2H, m), 8.29 (1H, d, J=9.62 Hz)

[2] Mass Spectrometry (ESI-TOF): m/z=696.4972 (M+H)$^+$

[Analysis Result of Compound (12)]

[1] $^1$H-NMR (400 MHz, CDCl$_3$, room temperature): δ (ppm)=0.98 (6H, q, J=7.33 Hz), 1.14 (7H, s), 1.33-1.44 (6H, m), 1.56 (9H, t, J=14.2 Hz), 1.64-1.75 (4H, m), 2.54 (3H, d, J=13.3 Hz), 3.17 (2H, s), 3.48 (3H, t, J=8.01 Hz), 3.80 (2H, t, J=7.33 Hz), 8.31 (1H, s)

[2] Mass Spectrometry (ESI-TOF): m/z=542.3279 (M+H)$^+$

[Analysis Result of Compound (13)]

[1] $^1$H-NMR (400 MHz, CDCl$_3$, room temperature): δ (ppm)=0.94 (12H, tt, J=5.88, 18.3 Hz), 1.27-1.46 (16H, m), 1.55 (9H, s), 1.87-1.95 (2H, m), 2.43 (3H, s), 3.29-3.44 (5H, m), 3.60-3.92 (2H, m), 7.21-7.33 (3H, m), 7.44-7.49 (2H, m), 8.17 (1H, s)

[2] Mass Spectrometry (ESI-TOF): m/z=674.4189 (M+H)$^+$

[Analysis Result of Compound (15)]

[1] $^1$H-NMR (400 MHz, CDCl$_3$, room temperature): δ (ppm)=0.89-0.96 (15H, m), 1.22-1.42 (18H, m), 1.57 (8H, t, J=16.5 Hz), 1.88-1.91 (9H, m), 2.01-2.13 (4H, m), 2.57 (3H, s), 3.12 (3H, s), 3.38-3.57 (2H, d, J=13.3 Hz), 3.73-3.96 (2H, m), 8.33 (1H, s)

[2] Mass Spectrometry (ESI-TOF): m/z=732.4933 (M+H)$^+$

[Analysis Result of Compound (18)]

[1] $^1$H-NMR (400 MHz, CDCl$_3$, room temperature): δ (ppm)=0.87-0.95 (12H, m), 1.11-1.24 (8H, m), 1.30-1.38 (18H, m), 1.53-1.60 (12H, t, J=13.5 Hz), 1.84-1.92 (1H, m), 2.54 (3H, d, J=11.5 Hz), 3.37-3.41 (2H, m), 3.54-3.91 (4H, m), 8.31 (1H, d, J=11.9 Hz)

[2] Mass Spectrometry (ESI-TOF): m/z=668.4662 (M+H)$^+$

[Analysis Result of Compound (20)]

[1] $^1$H-NMR (400 MHz, CDCl$_3$, room temperature): δ (ppm)=0.89-1.01 (15H, m), 1.25-1.42 (16H, m), 1.56 (11H, t, J=10.5 Hz), 1.60-1.75 (2H, m), 1.82-1.95 (5H, m), 2.86-2.91 (2H, m), 3.19 (3H, m), 3.35-3.42 (2H, m), 3.73-3.79 (2H, m), 8.32 (1H, s)

[2] Mass Spectrometry (ESI-TOF): m/z=654.4399 (M+H)$^+$

[Analysis Result of Compound (21)]

[1] $^1$H-NMR (400 MHz, CDCl$_3$, room temperature): δ (ppm)=0.88-1.01 (17H, m), 1.24-1.46 (18H, m), 1.51 (9H, s), 1.87-1.96 (2H, m), 2.70-2.74 (2H, m), 3.33 (3H, s), 3.40-3.50 (2H, m), 3.61-3.86 (2H, m), 7.22 (2H, t, J=7.56 Hz), 7.46 (3H, t, J=8.70 Hz), 8.15 (1H, s)

[2] Mass Spectrometry (ESI-TOF): m/z=716.4511 (M+H)$^+$

[Analysis Result of Compound (22)]

[1] $^1$H-NMR (400 MHz, CDCl$_3$, room temperature): δ (ppm)=0.81 (2H, t, J=6.18 Hz), 0.89-0.95 (12H, m), 1.03 (8H, t, J=3.66 Hz), 1.14 (7H, d, J=1.83 Hz), 1.26-1.39 (17H, m), 1.55 (12H, t, J=5.95 Hz), 1.84-1.91 (3H, m), 2.69-2.81 (1H, m), 2.98-3.08 (1H, m), 3.18 (2H, t, J=1.83 Hz), 3.45-3.48 (3H, m), 3.56-3.89 (2H, m), 8.32 (1H, t, J=6.87 Hz)

[2] Mass Spectrometry (ESI-TOF): m/z=738.5329 (M+H)$^+$

[Production of Toner]

Toners of the present invention and comparative toners were produced as follows:

Example 1

A mixture of 12 parts of the compound (1), that is, a coloring matter compound, and 120 parts of a styrene monomer was dispersed by an attritor (manufactured by Mitsui Kozan Co., Ltd.) for 3 hours, so as to obtain a coloring matter dispersion (1).

A 2 L four-necked flask equipped with a high-speed stirrer, T.K. homomixer (manufactured by Primix Corp.), was charged with 710 parts of ion exchanged water and 450 parts of a 0.1 mol/L trisodium phosphate aqueous solution, and these materials were heated to 60° C. with the number of rotations set to 12000 rpm. To the resultant, 68 parts of a 1.0 mol/L calcium chloride aqueous solution was gradually added, so as to prepare a water-based medium containing a fine poorly water-soluble dispersion stabilizer, calcium phosphate.

| | |
|---|---|
| Coloring matter dispersion (1) | 133.2 parts |
| Styrene monomer | 46.0 parts |
| n-Butyl acrylate monomer | 34.0 parts |
| Aluminum salicylate compound (manufactured by Orient Chemical Industries Co., Ltd., Bontron E-88) | 2.0 parts |
| Polar resin (polycondensate of propylene oxide-modified bisphenol A and isophthalic acid, having Tg of 65° C., Mw of 10000, and Mn of 6000) | 10.0 parts |
| Ester wax (having a peak temperature of the maximum endothermic peak obtained in DSC measurement of 70° C. and Mn of 704) | 25.0 parts |
| Divinyl benzene monomer | 0.10 part |

The formulation was heated to 60° C. and homogenously dissolved/dispersed by using a TK homomixer at 5000 rpm. In the resultant, 10 parts of 2,2'-azobis(2,4-dimethylvaleronitrile) serving as a polymerization initiator was dissolved, so as to prepare a polymerizable monomer composition.

The polymerizable monomer composition was introduced into the water-based medium, and the composition was granulated for 15 minutes with the number of rotations kept at 12000 rpm. Thereafter, with the high-speed stirrer changed to a propeller stirrer, polymerization was continuously performed at a liquid temperature of 60° C. for 5 hours, and then, the liquid temperature was raised to 80° C. and the polymerization was continued for 8 hours. After completing the polymerization reaction, the remaining monomers were distilled off at 80° C. under reduced pressure, and then, the liquid temperature was lowered to 30° C., so as to obtain a polymer fine particle dispersion.

Next, the polymer fine particle dispersion was transferred to a washing vessel, and dilute hydrochloric acid was added thereto with stirring for adjusting pH to 1.5, followed by stirring for 2 hours. The resultant was subjected to solid-liquid separation with a filter, so as to obtain polymer fine particles. Re-dispersion of the polymer fine particles in water and solid-liquid separation of the dispersion were repeatedly carried out until compounds of phosphoric acid and calcium including calcium phosphate were sufficiently removed. Thereafter, the polymer fine particles obtained ultimately by the solid-liquid separation were sufficiently dried by a drier, so as to obtain toner base particles (1).

With 100 parts of the thus obtained toner base particles, 1.00 part of a hydrophobic silica fine powder (with a number average particle size of primary particles of 7 nm) having been subjected to a surface treatment with hexamethyldisilazane, 0.15 part of rutile type titanium oxide fine powder (with a number average particle size of primary particles of 45 nm), and 0.50 part of rutile type titanium oxide fine powder (with a number average particle size of primary particles of 200 nm) were dry blended for 5 minutes by using a Henschel mixer (manufactured by Nippon Coke & Engineering Co., Ltd.), so as to obtain a toner (1) of the present invention.

Examples 2 to 8

Toners (2) to (8) of the present invention were obtained in the same manner as in Example 1 except that the compound (1) was changed to respective compounds shown in Table 1.

Example 9

A toner (9) of the present invention was obtained in the same manner as in Example 1 except that two types of compound, 6 parts of the compound (1) and 6 parts of C.I. Pigment Red 122 (manufactured by Clariant, trade name: Toner Magenta E) were used instead of 12 parts of the compound (1).

Example 10

A toner (10) of the present invention was obtained in the same manner as in Example 9 except that the compound (1) was changed to the compound (22).

Comparative Examples 1 to 3

Comparative toners (C1), (C2) and (C3) were obtained in the same manner as in Example 1 except that the following comparative coloring matters (1) to (3) were respectively used instead of the compound (1):

Comparative coloring matter (1)

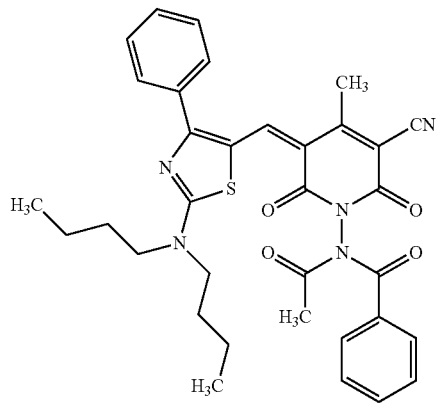

Comparative coloring matter (2)

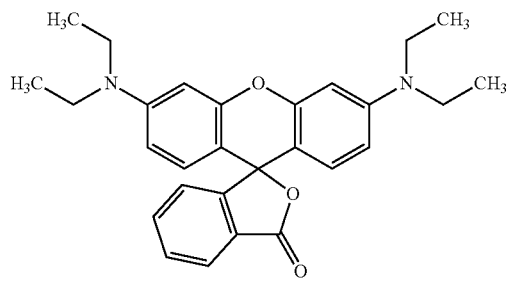

Comparative coloring matter (3)

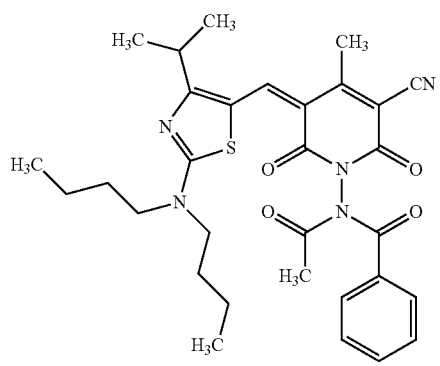

Example 11

82.6 parts of styrene, 9.2 parts of n-butyl acrylate, 1.3 parts of acrylic acid, 0.4 parts of hexanediol diacrylate, and 3.2 parts of n-lauryl mercaptan were mixed and dissolved. To the thus obtained solution, an aqueous solution of 1.5 parts of Neogen RK (manufactured by Daiichi Kogyo Co., Ltd.) in 150 parts of ion exchanged water was added to be dispersed. Furthermore, an aqueous solution of 0.15 part of potassium persulfate in 10 parts of ion exchanged water was added to the resulting solution with slowly stirring for 10 minutes. After nitrogen substitution, emulsion polymerization was carried out at 70° C. for 6 hours. After completing the polymerization, the obtained reaction solution was cooled to room temperature, and ion exchanged water was added thereto, so as to obtain a resin particle dispersion having a solid concentration of 12.5% by mass and a median diameter on a volume basis of 0.2 μm.

A wax dispersion was obtained by mixing 100 parts of an ester wax (having a peak temperature of the maximum endothermic peak obtained by the DSC measurement of 70° C. and Mn of 704) and 15 parts of Neogen RK with 385 parts of ion exchanged water and dispersing the resulting mixture for approximately 1 hour by using a wet jet mill JN100 (manufactured by Jokoh Co., Ltd.). The thus obtained wax dispersion had a concentration of 20% by mass.

A dispersion (1) was obtained by mixing 100 parts of the compound (1) used as a coloring matter compound and 15 parts of an anionic surfactant (Neogen RK, manufactured by Daiichi Kogyo Co., Ltd.) with 885 parts of ion exchanged water and dispersing the resulting mixture for approximately 1 hour by using a wet jet mill JN100 (manufactured by Jokoh Co., Ltd.).

The coloring agent particles had a median diameter on a volume basis of 0.15 μm.

After dispersing 160 parts of the resin particle dispersion, 10 parts of the wax dispersion, 10 parts of the dispersion (1), and 0.2 part of magnesium sulfate by using a homogenizer (manufactured by IKA, Ultra Turrax T50), the resulting solution was heated to 65° C. After stirring for 1 hour at 65° C., it was confirmed with an optical microscope that aggregate particles having an average particle size of approximately 5.5 μm had been formed. Furthermore, after adding 2.2 parts of Neogen RK to the resultant, the resulting solution was heated to 80° C. and stirred for 2 hours. After cooling to room temperature, the resulting solution was filtered, and the thus filtrated solid was introduced into 720 parts of ion exchanged water for performing dispersion washing for 1 hour. The resulting solid was filtered out, and the dispersion washing with ion exchanged water was repeatedly performed until the filtrate attained electric conductivity of 150 μS/cm or less. The resulting solid was dried by using a vacuum dryer, so as to obtain toner base particles (11).

A hundred parts of the toner base particles (11) and 1.8 parts of a hydrophobized silica fine powder having a specific surface area, measured by the BET, of 200 m²/g were dry blended by using a Henschel mixer (manufactured by Mitsui Kozan Co., Ltd.), so as to obtain a toner (11).

Examples 12 to 17

Toners (12) to (17) of the present invention were obtained in the same manner as in Example 11 except that compounds shown in Table 1 were respectively used instead of the compound (1).

Example 18

A hundred parts of C.I. Pigment Red 122 (manufactured by Clariant, trade name "Toner Magenta E") and 15 parts of an anionic surfactant (Neogen RK, manufactured by Daiichi Kogyo Co., Ltd.) were mixed with 885 parts of ion exchanged water, and the resulting mixture was dispersed by using a wet jet mill JN100 (manufactured by Jokoh Co., Ltd.) for approximately 1 hour, so as to obtain a pigment dispersion (1).

Toner base particles (18) were obtained in the same manner as in the production of the toner base particles of Example 11 except that 5 parts of the dispersion (1) and 5 parts of the pigment dispersion (1) were used instead of 10 parts of the dispersion (1) in producing the toner base particles.

With 100 parts of the toner base particles (18), 1.8 parts of a hydrophobized silica fine powder having a specific surface area, measured by the BET method, of 200 m²/g was dry blended by using a Henschel mixer (manufactured by Mitsui Kozan Co., Ltd.), so as to obtain a toner (18).

Example 19

A dispersion (20) was obtained in the same manner as in Example 11 except that the compound (20) was used instead of the compound (1). Next, a toner (19) was obtained in the same manner as in Example 18 except that the dispersion (1) was changed to the dispersion (20).

Comparative Examples 4 to 6

Comparative toners (C4) to (C6) were obtained in the same manner as in Example 11 except that the comparative coloring matters (1) to (3) were respectively used instead of the compound (1).

Example 20

100 parts of the binder resin (polyester resin) (having Tg of 55° C., an acid value of 20 mgKOH/g, a hydroxy value of 16 mgKOH/g, a molecular weight Mp (peak top molecular weight) of 4500, Mn of 2300, and MW of 38000), 6 parts of the compound (1), 0.5 part of aluminum 1,4-di-t-butylsalkylate compound, and 5 parts of paraffin wax (having a maximum exothermic peak temperature of 78° C.) were sufficiently mixed by using a Henschel mixer (FM-75J, manufactured by Mitsui Kozan Co., Ltd.), and the resulting mixture was kneaded at a feed rate of 60 kg/hr. with a twin-screw kneader (PCM-45, manufactured by Ikegai Corporation) set to a temperature of 130° C. (in which the temperature of a discharged kneaded product was approximately 150° C.). The thus obtained kneaded product was cooled and roughly crushed with a hammer mill, and then finely crushed at a feed rate of 20 kg/hr. with a mechanical crusher (T-250, manufactured by Freund-Turbo Corporation).

Furthermore, the thus obtained finely crushed toner product was classified by using a multi-division classifier utilizing the Coanda effect, so as to obtain toner base particles (20).

A hundred parts of the toner base particles (20) were dry blended with 1.8 parts of a hydrophobized silica fine powder having a specific surface area, measured by the BET method, of 200 m²/g by using a Henschel mixer (manufactured by Mitsui Kozan Co., Ltd.), so as to obtain a toner (20).

Examples 21 to 28

Toners (21) to (28) of the present invention were obtained in the same manner as in Example 20 except that compounds shown in Table 1 were respectively used instead of the compound (1). Incidentally, a mass ratio between the compound (1) and C.I. Pigment Red 122 (manufactured by Clariant, trade name "Toner Magenta E") was 2:1 in Example 27, and a mass ratio between the compound (4) and C.I. Pigment Red 122 was 3:2 in Example 28.

Comparative Examples 7 to 9

Comparative Toners (C7) to (C9) were obtained in the same manner as in Example 20 except that the comparative coloring matters (1) to (3) were respectively used instead of the compound (1).

The toners were evaluated as follows. Incidentally, the results of the evaluation are shown in Table 1 below.

(1) Measurement of weight average particle size D4 and number average particle size D1 of toner The number average particles size (D1) and the weight average particle size (D4) of each of the aforementioned toners were measured through particle size distribution analysis by the Coulter method. As a measurement apparatus, a Coulter counter TA-II or a Coulter multisizer II (manufactured by Beckman Coulter Inc.) was used, and the measurement was performed according to the operating manual of the apparatus. Primary sodium chloride was used for preparing a sodium chloride aqueous solution of approximately 1% concentration as an electrolytic solution. For example, ISOTON-II (manufactured by Coulter Scientific Japan Co., Ltd.) can be used. The measurement was specifically carried out as follows: To 100 to 150 mL of the electrolytic aqueous solution, 0.1 to 5 mL of a surfactant (preferably alkylbenzene sulfonate) was added as a dispersant, and 2 to 20 mg of a measurement sample (toner particles) was further added thereto. The resulting electrolytic solution having the sample suspended therein was subjected to a dispersion treatment for approximately 1 to 3 minutes by using a supersonic disperser. The thus obtained dispersion treatment solution was subjected to measurement for the volume and the number of toner particles with a size of 2.00 μm or more by using the aforementioned measurement apparatus equipped with a 100 μm aperture as an aperture, so as to calculate a volume distribution and a number distribution of the toner. Then, based on the thus obtained data, a number average particle size (D1) based on the number distribution of the toner, a weight average particle size (D4) (by using a medium of each channel as a representative value of the channel) based on the volume distribution of the toner, and a D4/D1 ratio were obtained.

As channels, thirteen channels of 2.00 to 2.52 μm, 2.52 to 3.17 μm, 3.17 to 4.00 μm, 4.00 to 5.04 μm, 5.04 to 6.35 μm, 6.35 to 8.00 μm, 8.00 to 10.08 μm, 10.08 to 12.70 μm, 12.70 to 16.00 μm, 16.00 to 20.20 μm, 20.20 to 25.40 μm, 25.40 to 32.00 μm, and 32.00 to 40.30 μm were used.

The evaluation was made as follows, and if the D4/D1 ratio is 1.35 or less, it was determined that the particle size distribution is sharp and suitable.

A: The D4/D1 ratio is 1.30 or less (which means that the particle size distribution is excellent);

B: the D4/D1 ratio is larger than 1.30 and 1.35 or less (which means that the particle size distribution is good); and C: the D4/D1 ratio is larger than 1.35 (which means that the particle size distribution is poor).

[Evaluation of Light Resistance of Toner]

A sample for light resistance evaluation was prepared by uniformly spreading 0.5 g of each toner on a glass substrate of 2 cm², and heat-pressing the resulting substrate under conditions of 160° C. and 1 kg by using BIG HEATER (manufactured by Imoto Machinery Co., Ltd.).

The sample for light resistance evaluation was loaded in a xenon weatherometer (Atlas Ci 4000, manufactured by Suga Test Instruments Co., Ltd.), and was exposed for 50 hrs. under conditions of illumination of 0.39 W/m² at 340 nm, a temperature of 40° C. and relative humidity of 60%. The reflection density of the sample for light resistance evaluation was measured before and after the test. Assuming that the initial chromaticity values were $a_0^*$, $b_0^*$ and $L_0^*$, and that the chromaticity values attained after the exposure were $a^*$, $b^*$ and $L^*$, a color difference $\Delta E$ was defined and calculated as follows:

$$\Delta E = \sqrt{(a^*-a_0^*)^2+(b^*-b_0^*)^2+(L^*-L_0^*)^2}$$

[Expression 1]

Evaluation criteria are as follows. As the evaluation, it was determined that the light resistance was good if $\Delta E$ obtained after 50 hours was less than 10.

A: $\Delta E<6$ (which means that the light resistance is extremely excellent);

B: $6 \leq \Delta E<10$ (which means that the light resistance is excellent);

C: $10 \leq \Delta E$ (which means that the light resistance is poor).

TABLE 1

| No | Toner No. | Coloring agent | Production method | D50 | D4/D1 | Particle size distribution | ΔE obtained after 50 hrs. | Evaluation of light resistance |
|---|---|---|---|---|---|---|---|---|
| Example 1 | 1 | Compound (1) | Suspension polymerization method | 5.6 | 1.20 | A | 4.4 | A |
| Example 2 | 2 | Compound (3) | Suspension polymerization method | 5.9 | 1.18 | A | 4.3 | A |
| Example 3 | 3 | Compound (6) | Suspension polymerization method | 5.7 | 1.21 | A | 4.2 | A |
| Example 4 | 4 | Compound (10) | Suspension polymerization method | 5.6 | 1.20 | A | 4.3 | A |
| Example 5 | 5 | Compound (12) | Suspension polymerization method | 5.0 | 1.21 | A | 5.5 | A |
| Example 6 | 6 | Compound (13) | Suspension polymerization method | 5.5 | 1.22 | A | 4.6 | A |
| Example 7 | 7 | Compound (20) | Suspension polymerization method | 5.4 | 1.19 | A | 4.5 | A |
| Example 8 | 8 | Compound (22) | Suspension polymerization method | 5.6 | 1.21 | A | 4.8 | A |
| Example 9 | 9 | Compound (1) + P.R. 122 | Suspension polymerization method | 4.8 | 1.21 | A | 3.2 | A |
| Example 10 | 10 | Compound (22) + P.R. 122 | Suspension polymerization method | 5.5 | 1.20 | A | 3.1 | A |
| Example 11 | 11 | Compound (1) | Emulsion aggregation method | 6.2 | 1.17 | A | 5.7 | A |
| Example 12 | 12 | Compound (3) | Emulsion aggregation method | 6.3 | 1.17 | A | 5.3 | A |
| Example 13 | 13 | Compound (6) | Emulsion aggregation method | 5.6 | 1.17 | A | 5.3 | A |
| Example 14 | 14 | Compound (15) | Emulsion aggregation method | 6.4 | 1.16 | A | 5.1 | A |
| Example 15 | 15 | Compound (18) | Emulsion aggregation method | 6.5 | 1.17 | A | 5.3 | A |
| Example 16 | 16 | Compound (20) | Emulsion aggregation method | 6.4 | 1.18 | A | 5.1 | A |
| Example 17 | 17 | Compound (22) | Emulsion aggregation method | 6.3 | 1.18 | A | 4.9 | A |
| Example 18 | 18 | Compound (1) + P.R. 122 | Emulsion aggregation method | 6.3 | 1.18 | A | 4.5 | A |
| Example 19 | 19 | Compound (20) + P.R. 122 | Emulsion aggregation method | 6.2 | 1.18 | A | 3.5 | A |
| Example 20 | 20 | Compound (1) | Pulverization method | 6.8 | 1.32 | B | 8.9 | B |
| Example 21 | 21 | Compound (3) | Pulverization method | 6.3 | 1.27 | A | 7.3 | B |
| Example 22 | 22 | Compound (10) | Pulverization method | 6.9 | 1.34 | B | 8.1 | B |
| Example 23 | 23 | Compound (4) | Pulverization method | 6.7 | 1.26 | A | 5.5 | A |
| Example 24 | 24 | Compound (20) | Pulverization method | 6.8 | 1.25 | A | 5.1 | A |
| Example 25 | 25 | Compound (21) | Pulverization method | 6.7 | 1.30 | B | 5.2 | A |
| Example 26 | 26 | Compound (22) | Pulverization method | 6.5 | 1.25 | A | 4.9 | A |
| Example 27 | 27 | Compound (1) + P.R. 122 | Pulverization method | 6.6 | 1.30 | B | 5.4 | A |
| Example 28 | 28 | Compound (4) + P.R. 122 | Pulverization method | 6.3 | 1.27 | A | 3.8 | A |
| Comparative Example 1 | C1 | Comparative coloring matter (1) | Suspension polymerization method | 5.5 | 1.58 | C | 20.4 | C |
| Comparative Example 2 | C2 | Comparative coloring matter (2) | Suspension polymerization method | 6.8 | 1.80 | C | *1 | C |
| Comparative Example 3 | C3 | Comparative coloring matter (3) | Suspension polymerization method | 5.6 | 1.66 | C | 60.5 | C |
| Comparative Example 4 | C4 | Comparative coloring matter (1) | Emulsion aggregation method | 6.3 | 1.20 | A | 25.4 | C |
| Comparative Example 5 | C5 | Comparative coloring matter (2) | Emulsion aggregation method | 6.7 | 1.18 | A | *2 | C |
| Comparative Example 6 | C6 | Comparative coloring matter (3) | Emulsion aggregation method | 6.5 | 1.20 | A | 33.8 | C |
| Comparative Example 7 | C7 | Comparative coloring matter (1) | Pulverization method | 6.8 | 1.32 | B | 32.5 | C |
| Comparative Example 8 | C8 | Comparative coloring matter (2) | Pulverization method | 6.7 | 1.33 | B | *3 | C |
| Comparative Example 9 | C9 | Comparative coloring matter (3) | Pulverization method | 6.6 | 1.34 | B | 38.9 | C |

*1: ΔE >80 after 20 hours
*2: ΔE >80 after 20 hours
*3: ΔE >80 after 15 hours

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-188150, filed on Aug. 29, 2012, which is hereby incorporated by reference herein in its entirety.

What is claimed is:

1. A toner comprising toner base particles, each of which contains a binder resin, a wax and a coloring agent, wherein a coloring matter compound represented by the general formula (1) is contained as the coloring agent:

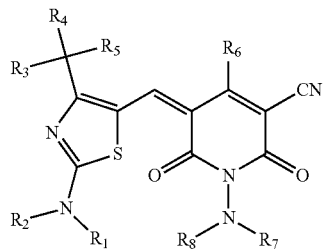

General formula (1)

wherein $R_1$ and $R_2$ each independently represent an alkyl group having 1 to 20 carbon atoms, $R_3$ to $R_5$ each independently represent an alkyl group having 1 to 4 carbon atoms, $R_6$ represents an alkyl group, and $R_7$ and $R_8$ each independently represent an alkyl group or an acyl group, or $R_7$ and $R_8$ are bonded to each other, so as to form a cyclic organic functional group containing $R_7$, $R_8$ and a nitrogen atom bonded to $R_7$ and $R_8$.

2. The toner according to claim 1, wherein either one of $R_7$ and $R_8$ of the general formula (1) represents an alkyl group.

3. The toner according to claim 1, wherein all of $R_3$ to $R_5$ of the general formula (1) represent a methyl group.

4. The toner according to claim 1, wherein the toner base particles have an external additive on surfaces thereof.

5. The toner according to claim 1, wherein the toner base particles are prepared by suspension polymerization method or emulsion aggregation method performed in a water-based medium.

6. The toner according to claim 1, wherein the toner base particles are prepared by a pulverization method.

* * * * *